(12) United States Patent
Seki et al.

(10) Patent No.: US 10,656,585 B2
(45) Date of Patent: May 19, 2020

(54) CONSUMABLE MANAGEMENT APPARATUS, CONSUMABLE MANAGEMENT SYSTEM, AND CONSUMABLE MANAGEMENT METHOD

(71) Applicants: Takeo Seki, Kanagawa (JP); Akiyoshi Nakai, Kanagawa (JP); Ko Tokumaru, Tokyo (JP); Masaru Kaneko, Kanagawa (JP)

(72) Inventors: Takeo Seki, Kanagawa (JP); Akiyoshi Nakai, Kanagawa (JP); Ko Tokumaru, Tokyo (JP); Masaru Kaneko, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/356,377

(22) Filed: Mar. 18, 2019

(65) Prior Publication Data
US 2019/0286038 A1 Sep. 19, 2019

(30) Foreign Application Priority Data

Mar. 19, 2018 (JP) ................. 2018-051465
Mar. 19, 2018 (JP) ................. 2018-051787

(51) Int. Cl.
*G03G 15/00* (2006.01)
*H04N 1/32* (2006.01)
*H04N 1/23* (2006.01)
*H04N 1/00* (2006.01)

(52) U.S. Cl.
CPC ....... *G03G 15/553* (2013.01); *H04N 1/00034* (2013.01); *H04N 1/00074* (2013.01); *H04N 1/2346* (2013.01); *H04N 1/32635* (2013.01)

(58) Field of Classification Search
CPC ............. G03G 15/553; H04N 1/00034; H04N 1/00074; H04N 1/2346; H04N 1/32635
See application file for complete search history.

(56) References Cited

U.S. PATENT DOCUMENTS

| | | | |
|---|---|---|---|
| 6,249,774 B1 * | 6/2001 | Roden | G06Q 10/087 705/28 |
| 2004/0098480 A1 * | 5/2004 | Sekizawa | G06F 11/3006 709/224 |
| 2010/0202787 A1 * | 8/2010 | Satonaga | G03G 15/55 399/24 |

FOREIGN PATENT DOCUMENTS

| | | |
|---|---|---|
| JP | 2002-099184 | 4/2002 |
| JP | 2009-140012 | 6/2009 |
| JP | 2013-011674 | 1/2013 |

* cited by examiner

*Primary Examiner* — Gregory H Curran
(74) *Attorney, Agent, or Firm* — Oblon, McClelland, Maier & Neustadt, L.L.P.

(57) ABSTRACT

According to an embodiment, a consumable management apparatus includes a detecting unit, a storage unit, an analyzing circuit, a predicting circuit, and a notifying circuit. The detecting unit detects a use condition of a consumable. The storage unit stores therein a use history of the consumable. The analyzing circuit is configured to analyze a consumption speed of the consumable based on a degree of use frequency of the consumable, the degree of use frequency being obtained from the use history of the consumable stored in the storage unit. The predicting circuit is configured to predict a replacement time of the consumable from the use condition of the consumable detected by the detecting unit and the consumption speed of the consumable analyzed by the analyzing circuit. The notifying circuit is configured to give a notice of the replacement time of the consumable predicted by the predicting circuit.

17 Claims, 14 Drawing Sheets

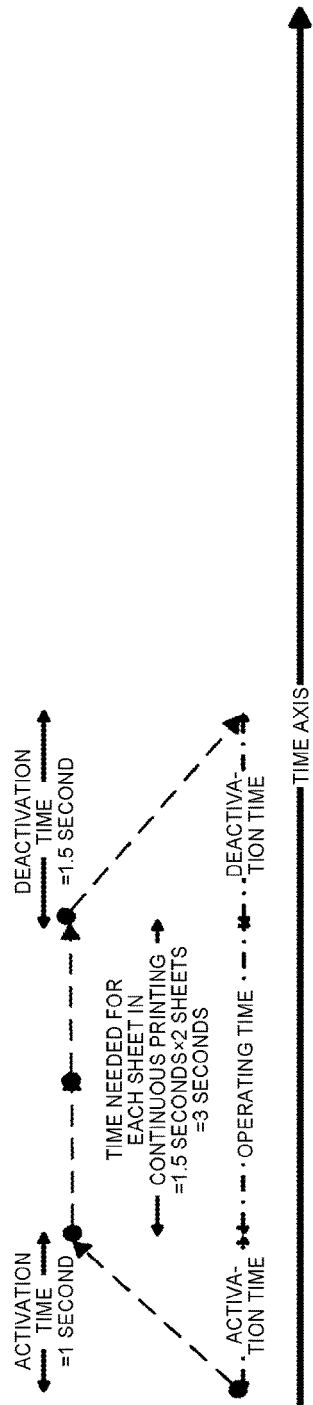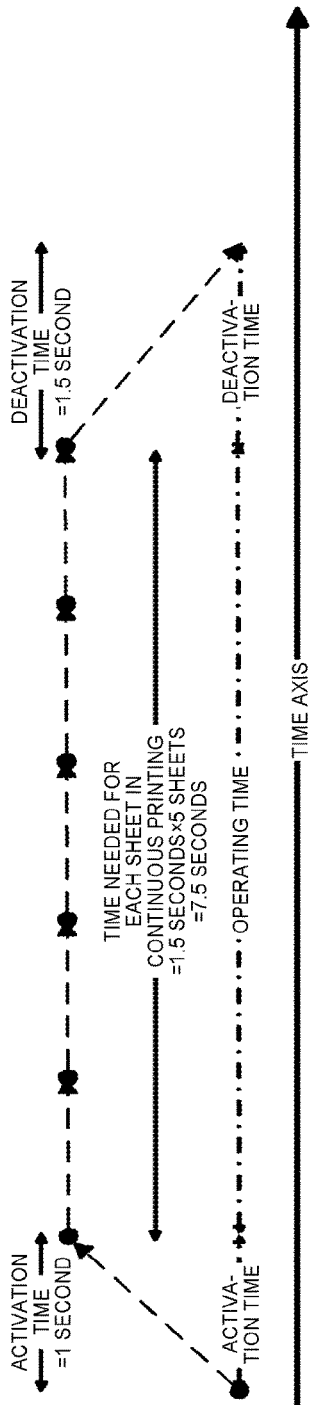

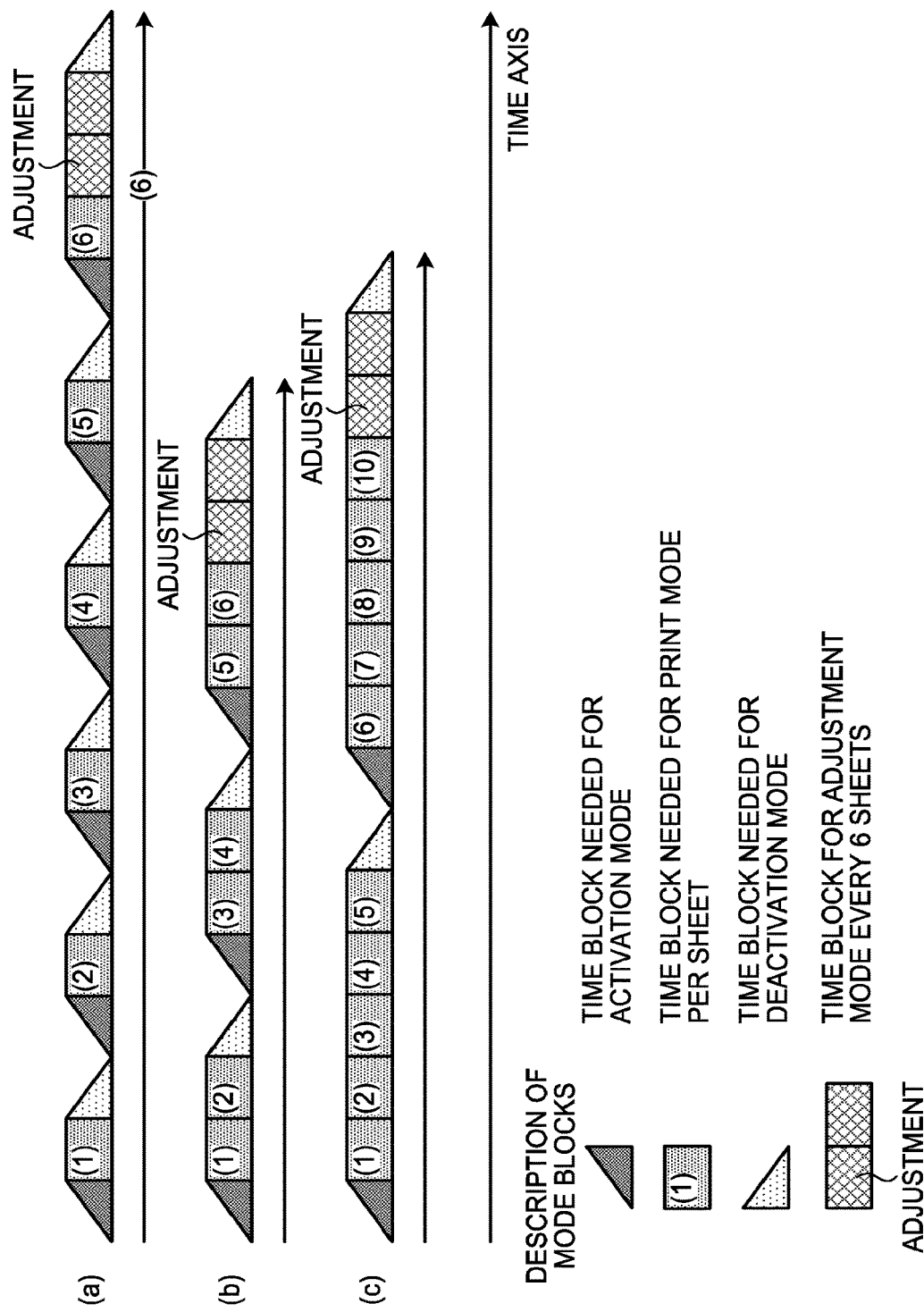

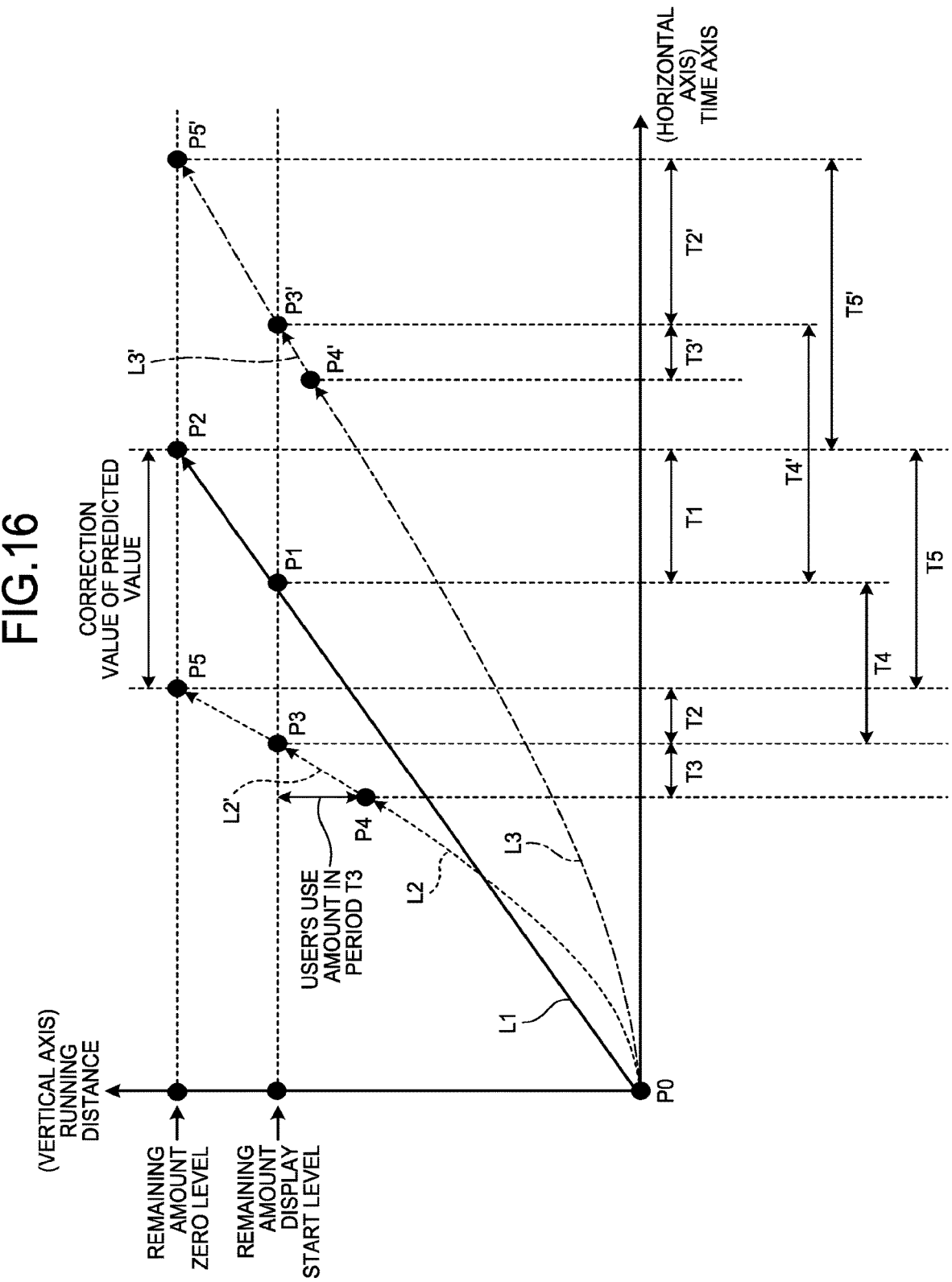

FIG.19

★NOTE★
REPLACEMENT TIME OF DEVELOPING UNIT IS APPROACHING
NUMBER OF REMAINING PRINTABLE SHEETS
  A4 LANDSCAPE: 200 SHEETS
  A4 PORTRAIT: 130 SHEETS
★PLEASE PREPARE REPLACEABLE UNIT

CONSUMABLE MANAGEMENT APPARATUS, CONSUMABLE MANAGEMENT SYSTEM, AND CONSUMABLE MANAGEMENT METHOD

CROSS-REFERENCE TO RELATED APPLICATIONS

The present application claims priority under 35 U.S.C. § 119 to Japanese Patent Application No. 2018-051465, filed on Mar. 19, 2018 and Japanese Patent Application No. 2018-051787, filed on Mar. 19, 2018. The contents of which are incorporated herein by reference in their entirety.

BACKGROUND OF THE INVENTION

1. Field of the Invention

The present invention relates to a consumable management apparatus, a consumable management system, and a consumable management method.

2. Description of the Related Art

Conventionally, a technology for managing a remaining amount of a consumable associated with use of an apparatus, and appropriately requesting a user to replace the consumable even when the pace of use of the consumable varies for each user has been known.

For example, Japanese Unexamined Patent Application Publication No. 2002-99184 discloses a technique for accurately recognizing a use frequency of a consumable per unit time, and even when the number of usage changes depending on a user, giving a notice of replacement of the consumable at an appropriate timing in accordance with the change, in order to present an appropriate consumable replacement day to the user.

However, in the conventional technique as described above, while a method of determining the consumable replacement day based on the pace of use in a certain period is adopted, a situation in which even the same user uses the consumable at different paces in a busy period and a slack period is not taken into account, so that the consumable replacement day presented to the user may be inappropriate in some cases.

In view of the above-described circumstances, there is a need to provide a consumable management apparatus, a consumable management system, and a consumable management method capable of presenting an appropriate consumable replacement day to a user.

SUMMARY OF THE INVENTION

According to an embodiment, a consumable management apparatus includes a detecting unit, a storage unit, an analyzing circuit, a predicting circuit, and a notifying circuit. The detecting unit detects a use condition of a consumable. The storage unit stores therein a use history of the consumable. The analyzing circuit is configured to analyze a consumption speed of the consumable based on a degree of use frequency of the consumable, the degree of use frequency being obtained from the use history of the consumable stored in the storage unit. The predicting circuit is configured to predict a replacement time of the consumable from the use condition of the consumable detected by the detecting unit and the consumption speed of the consumable analyzed by the analyzing circuit. The notifying circuit is configured to give a notice of the replacement time of the consumable predicted by the predicting circuit.

BRIEF DESCRIPTION OF THE DRAWINGS

FIGS. 14A, 14B, and 14C are diagrams for explaining the way of displaying a remaining amount of the consumable;

FIG. 15 is a diagram for explaining a running time when an adjustment mode is taken into account in a print job;

FIG. 16 is a diagram for explaining a method of calculating an available remaining amount of a consumable;

FIG. 19 is a diagram illustrating an example of a screen displayed on a display unit.

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
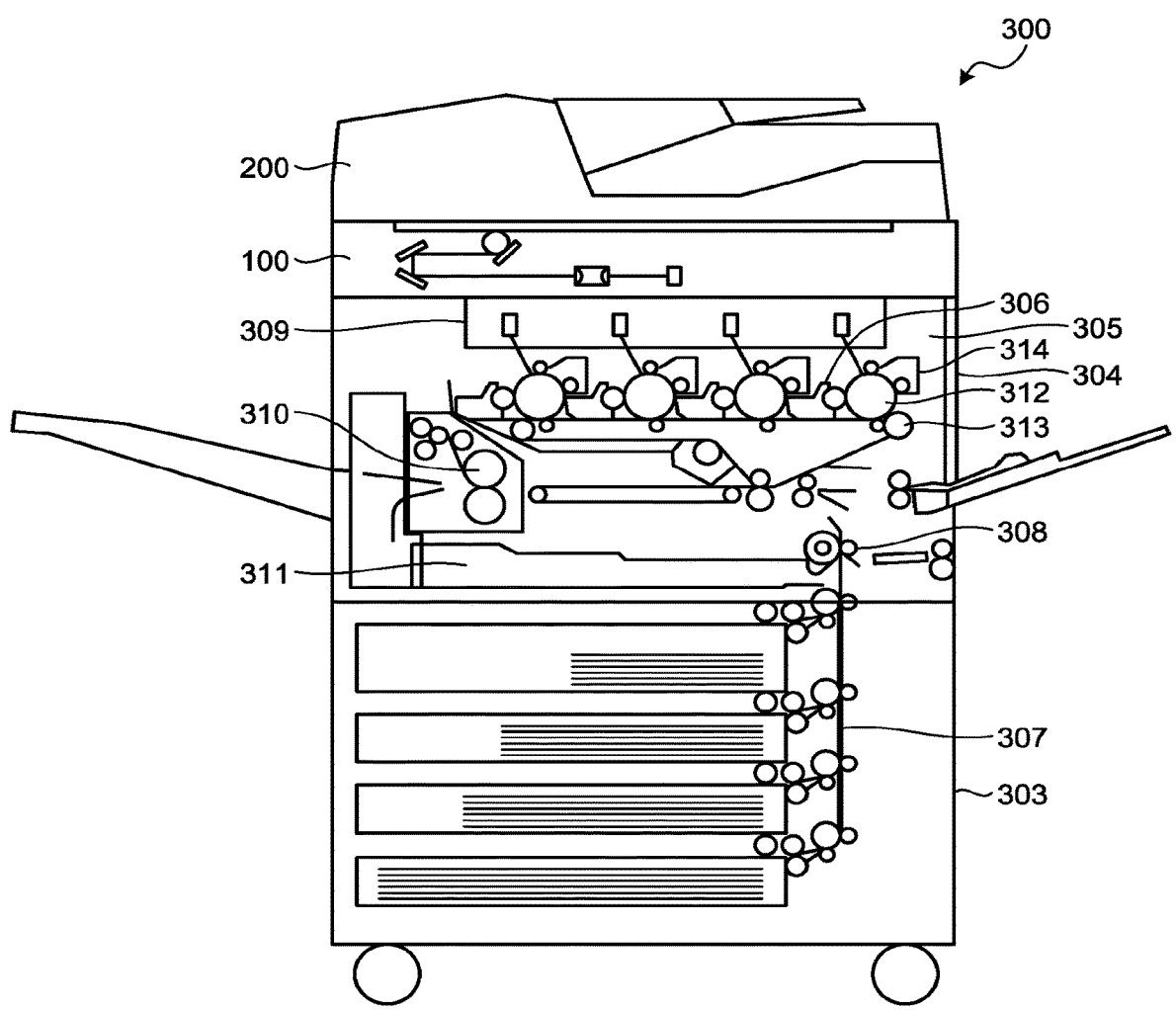
FIG. 1 is a configuration diagram illustrating an example of an apparatus to which a consumable management apparatus according to a first embodiment is applied.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Exemplary embodiments of a consumable management apparatus, a consumable management system, and a consumable management method will be described in detail below with reference to the accompanying drawings.

First Embodiment

FIG. 1 is a configuration diagram illustrating an example of an apparatus to which a consumable management apparatus according to a first embodiment is applied. In FIG. 1, an image forming apparatus 300 is illustrated as one example of an apparatus applied in the first embodiment. The image forming apparatus 300 may be applied to a multifunction peripheral (MFP) that has at least two of a copy function, a printer function, a scanner function, and a facsimile function. Further, the apparatus is not limited to the image forming apparatus. Examples of an apparatus other than the image forming apparatus include a robot and an amusement device.

The image forming apparatus 300 illustrated in FIG. 1 is a digital copier that includes a sheet feed unit 303 and an image forming apparatus main body 304, and further includes an image reading apparatus 100 and an automatic document feeder 200 that are mounted on the image forming apparatus main body 304.

The image forming apparatus main body 304 includes a tandem-type image forming unit 305, a registration roller 308 that conveys recording paper that is supplied to the image forming unit 305 from the sheet feed unit 303 through a conveying path 307, an optical writing device 309, a fixing conveying unit 310, and a duplex tray 311.

In the image forming unit 305, four photoconductor drums 312 corresponding to four colors of yellow (Y), magenta (M), cyan (C), and black (K) are arranged side by side. Image forming components including a charging unit, a developing unit 306, a transfer unit, a cleaner, and a neutralizer are arranged around each of the photoconductor drums 312.

Further, an intermediate transfer belt 313 that is extended between a driving roller and a driven roller is arranged between the transfer units and the photoconductor drums 312 so as to be sandwiched between nips of the transfer units and the photoconductor drums 312.

The tandem-type image forming apparatus 300 configured as described above performs optical writing on each of the photoconductor drums 312 for the corresponding colors of Y, M, C, and K, causes the developing unit 306 to perform developing for each corresponding toner contained in cartridges 314 of the four colors, and performs primary transfer on the intermediate transfer belt 313 in order of Y, M, C, and K for example.

Then, the image forming apparatus 300 secondarily transfers, on a recording paper, a full-color image in which the four colors are superimposed by the primary transfer, and thereafter performs fixing and paper ejection, so that a full-color image is formed on the recording paper. Further, the image forming apparatus 300 forms an image read by the image reading apparatus 100 on a recording paper.

Figure 2:
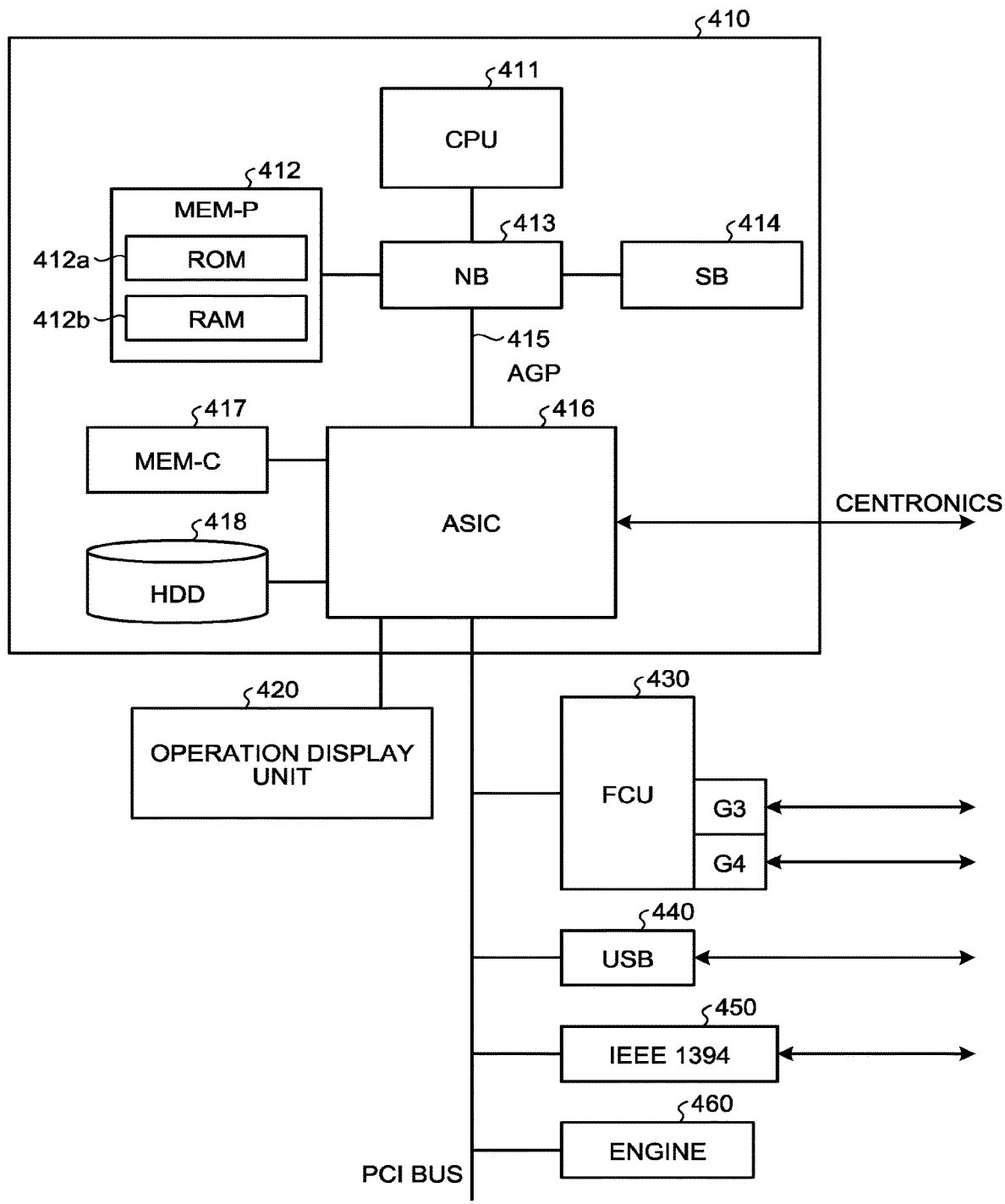
FIG. 2 is a block diagram illustrating a hardware configuration example of the apparatus illustrated in FIG. 1.

FIG. 2 is a block diagram illustrating a hardware configuration example of the apparatus illustrated in FIG. 1. As illustrated in FIG. 2, the image forming apparatus 300 that is one example of the apparatus illustrated in FIG. 1 is constructed by connecting a controller 410 and an engine unit (Engine) 460 via a peripheral component interface (PCI) bus. The controller 410 is a controller that controls the entire image forming apparatus 300, drawing processing, communications, and input operation through an operating unit (not illustrated). The engine unit 460 is an engine that is connectable to the PCI bus, and is, for example, a print engine, such as a plotter. The engine unit 460 includes an image processing section for performing error diffusion, gamma correction, and the like, in addition to an engine section.

The controller 410 includes a central processing unit (CPU) 411, a north bridge (NB) 413, a system memory (MEM-P) 412, a south bridge (SB) 414, a local memory (MEM-C) 417, an application specific integrated circuit (ASIC) 416, and a hard disk drive (HDD) 418. The NB 413 and the ASIC 416 are connected to each other by an accelerated graphics port (AGP) bus 415. The MEM-P 412 includes a read only memory (ROM) 412a and a random access memory (RAM) 412b.

The CPU 411 controls the entire image forming apparatus 300, includes a chipset formed of the NB 413, the MEM-P 412, and the SB 414, and is connected to other apparatuses via the chipset.

The NB 413 is a bridge for connecting the CPU 411, the MEM-P 412, the SB 414, and the AGP 415 to one another. The NB 413 includes a memory controller for controlling read and write with respect to the MEM-P 412, and also includes a PCI master and an AGP target.

The MEM-P 412 is a system memory used as a memory for storing computer programs and data, a memory for loading computer programs and data, and a memory for use in drawing processing performed by a printer. The MEM-P 412 is a storage device including the ROM 412a and the RAM 412b. The ROM 412a is a read-only memory for storing computer programs and data. The RAM 412b is a writable and readable memory used for loading computer programs and data or used for drawing processing performed by a printer.

The SB 414 is a bridge for connecting the NB 413, PCI devices, and peripheral devices to one another. The SB 414 is connected to the NB 413 via the PCI bus. A network interface (I/F) unit or the like is also connected to the PCI bus.

The ASIC 416 is an integrated circuit (IC) used for image processing including a hardware element for image processing, and has a function as a bridge to connect the AGP 415, the PCI bus, the HDD 418, and the MEM-C 417 to one another. The ASIC 416 includes a PCI target and an AGP master; an arbiter (ARB) that is a central core of the ASIC 416; a memory controller that controls the MEM-C 417; a plurality of direct memory access controllers (DMACs) that rotates image data by using hardware logic; and a PCI unit that performs data transfer with the engine unit 460 via the PCI bus. A facsimile control unit (FCU) 430, a universal serial bus (USB) 440, and the institute of electrical and electronics engineers 1394 (IEEE 1394) interface 450 are connected to the ASIC 416 via the PCI bus. An operation display unit 420 is directly connected to the ASIC 416.

The MEM-C 417 is a local memory used as a copy image buffer and a code buffer. The HDD 418 is a storage device for storing image data, computer programs, font data, and forms.

The AGP 415 is a bus interface for a graphics accelerator card introduced to speed up graphics processing. The AGP 415 allows direct access to the MEM-P 412 with a high throughput, thereby speeding up operation related to the graphics accelerator card.

Figure 3:
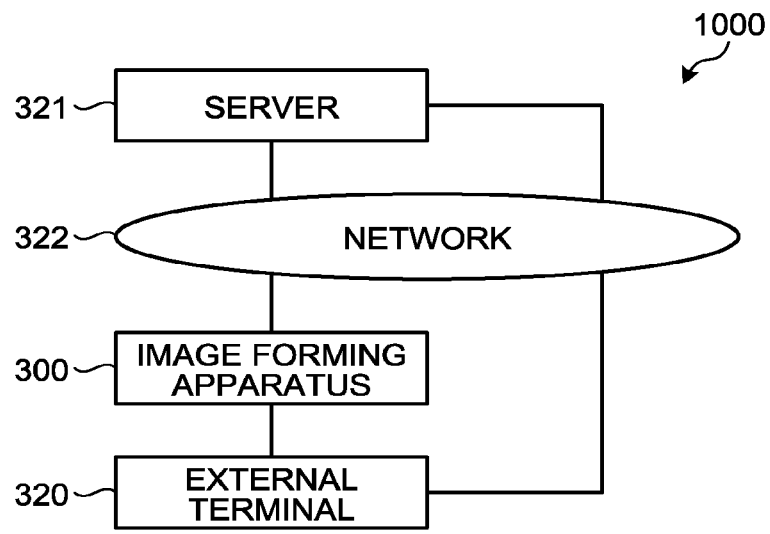
FIG. 3 is a block diagram illustrating a configuration of a consumable management system including the apparatus to which the consumable management apparatus according to the first embodiment is applied.

FIG. 3 is a block diagram illustrating a configuration of a consumable management system 1000 including the apparatus to which the consumable management apparatus according to the first embodiment is applied. As illustrated in FIG. 3, the consumable management system 1000 including the above-described image forming apparatus 300 includes, for example, an external terminal 320 and a server 321, in addition to the image forming apparatus 300. The external terminal 320 and the image forming apparatus 300 are connected to each other in a wired or wireless manner. Further, the external terminal 320 and the image forming apparatus 300 are connected to the server 321 via a network 322.

The external terminal 320 is, for example, a personal computer (PC) or the like, and is an externally connected apparatus that is connected to the image forming apparatus 300 in a wired or wireless manner outside the image forming apparatus 300. The external terminal 320 includes a control device, such as a CPU, a storage device, such as a ROM or a RAM, an external storage device, such as an HDD or a compact disc (CD) drive device, a display device, such as a display, and an input device, such as a keyboard or a mouse, and has a hardware configuration using a normal computer. The external terminal 320 is able to input various kinds of data from the image forming apparatus 300 and output various kinds of data to the image forming apparatus 300.

The server 321 is, for example, a PC or the like, and is an externally connected apparatus that is connected to the image forming apparatus 300 and the external terminal 320 via the network 322 outside the image forming apparatus 300. The server 321 includes a control device, such as a CPU, a storage device, such as a ROM or a RAM, an external storage device, such as an HDD or a CD drive device, a display device, such as a display, and an input device, such as a keyboard or a mouse, and has a hardware configuration using a normal computer. The server 321 is able to input various kinds of data from the image forming apparatus 300 and the external terminal 320 and output various kinds of data to the image forming apparatus 300 and the external terminal 320.

Figure 4:
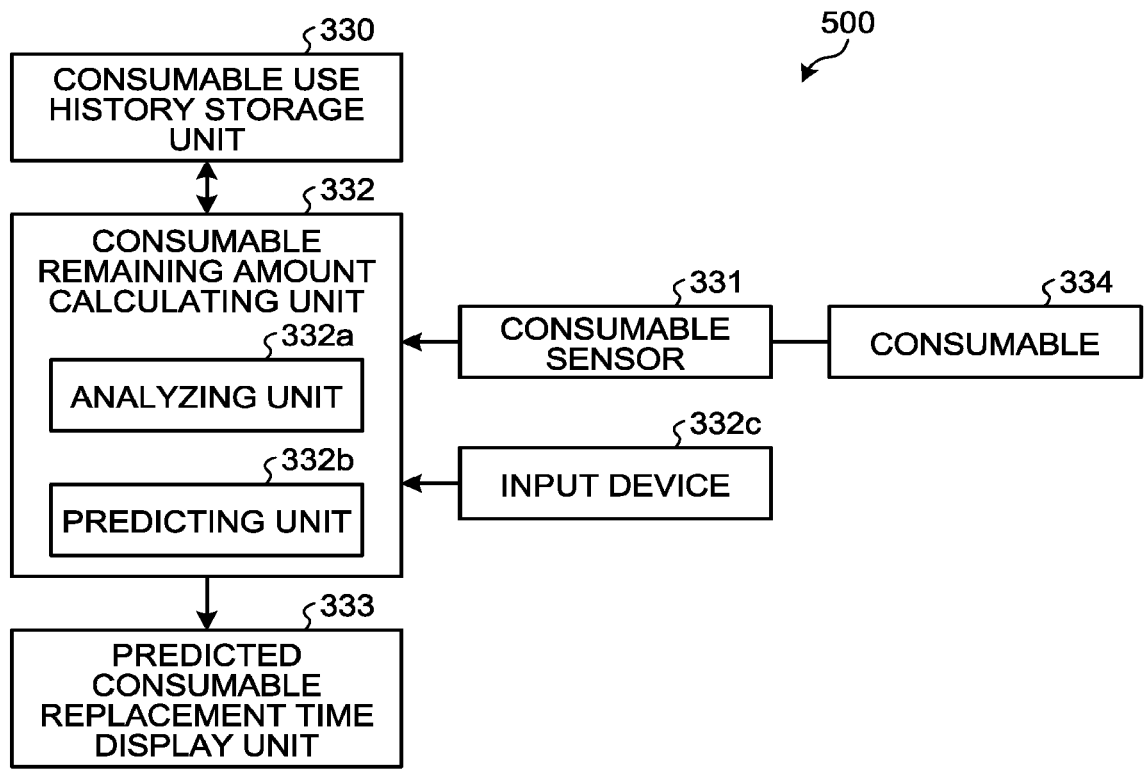
FIG. 4 is a block diagram illustrating a configuration of the consumable management apparatus according to the first embodiment.

FIG. 4 is a block diagram illustrating a configuration of a consumable management apparatus 500 according to the first embodiment. As illustrated in FIG. 4, the consumable management apparatus 500 includes a consumable use history storage unit 330 (storage means), a consumable sensor 331 (detecting means), a consumable remaining amount calculating unit 332, and a predicted consumable replacement time display unit 333 (notifying means).

The consumable use history storage unit 330 is a storage device for storing data, and an HDD, a nonvolatile memory, or the like may be adopted. The consumable use history storage unit 330 stores therein a use history of a consumable 334, a calculation result obtained by the consumable remaining amount calculating unit 332, and a program and data for causing the consumable remaining amount calculating unit 332 to operate. The use history of the consumable 334 and the calculation result obtained by the consumable remaining amount calculating unit 332 are continuously stored after the consumable 334 is replaced. Meanwhile, in a case of a new apparatus, the use history of the consumable 334 is not present, and therefore, a use history that is prepared in advance (for example, pseudo data that is prepared for each business type) is stored in the consumable use history storage unit 330.

The consumable sensor 331 directly or indirectly measures a use amount or a remaining amount of the consumable 334. The consumable 334 may be toner as a component to be consumed in the image forming apparatus 300, and may be the fixing conveying unit 310 as a component to be deteriorated in the image forming apparatus 300. In the case of the toner, the consumable sensor 331 measures a use amount or a remaining amount of the toner in the cartridges 314. Further, in the case of the fixing conveying unit 310, the consumable sensor 331 measures a rotation distance (hereinafter, referred to as a running distance) of the fixing conveying unit 310. Meanwhile, the use history of the consumable 334 stored in the consumable use history storage unit 330 may be obtained by recording the use amount or the remaining amount of the consumable 334 from the consumable sensor 331 per unit time. The number of the consumable sensors 331 is not limited to one, and it may be possible to provide the plurality of consumable sensors 331.

The consumable remaining amount calculating unit 332 is a control device, such as a CPU. The consumable remaining amount calculating unit 332 includes an analyzing unit 332a (analyzing means) and a predicting unit 332b (predicting means). The consumable remaining amount calculating unit 332 implements functions of the analyzing unit 332a and the predicting unit 332b by causing a processor, such as a CPU, to execute a predetermined program.

The analyzing unit 332a obtains a degree of use frequency of the consumable 334 from the use history of the consumable 334 stored in the consumable use history storage unit 330. Then, the analyzing unit 332a analyzes a consumption speed of the consumable 334 on the basis of the use frequency of the consumable 334.

The predicting unit 332b predicts a replacement time of the currently used consumable 334 from a use condition of the currently used consumable 334 and the consumption speed of the consumable 334.

The predicted consumable replacement time display unit 333 displays the replacement time predicted by the consumable remaining amount calculating unit 332. The predicted consumable replacement time display unit 333 is, for example, a display device, such as a display.

The above-described consumable management apparatus 500 includes, in the apparatus that uses the consumable 334 (for example, the image forming apparatus 300 illustrated in FIG. 3), the consumable use history storage unit 330 (storage means), the consumable sensor 331 (detecting means), the consumable remaining amount calculating unit 332 (the analyzing unit 332a (analyzing means) and the predicting unit 332b (predicting means)), and the predicted consumable replacement time display unit 333 (notifying means). In other words, the consumable management apparatus 500 of the first embodiment is integrated with the apparatus (the image forming apparatus 300) that uses the consumable 334, and is able to integrally manage the consumable 334 used in the apparatus.

Further, the above-described consumable management apparatus 500 may include the consumable sensor 331 (detecting means) in the apparatus (for example, the image forming apparatus 300 illustrated in FIG. 3) that uses the consumable 334, include the consumable use history storage unit 330 (storing means) in the external terminal 320 or the server 321 that is externally connected to the apparatus, include the consumable remaining amount calculating unit 332 (the analyzing unit 332a (analyzing means) and the predicting unit 332b (predicting means)) in the external terminal 320 or the server 321, and include the predicted consumable replacement time display unit 333 (notifying means) in the apparatus that uses the consumable 334, the external terminal 320, or the server 321. In other words, the consumable management apparatus 500 of the first embodiment is able to manage the consumable 334 used in the apparatus while distributing the functions to the apparatus (the image forming apparatus 300) that uses the consumable 334 and the external terminal 320 or the server 321.

Figure 5:
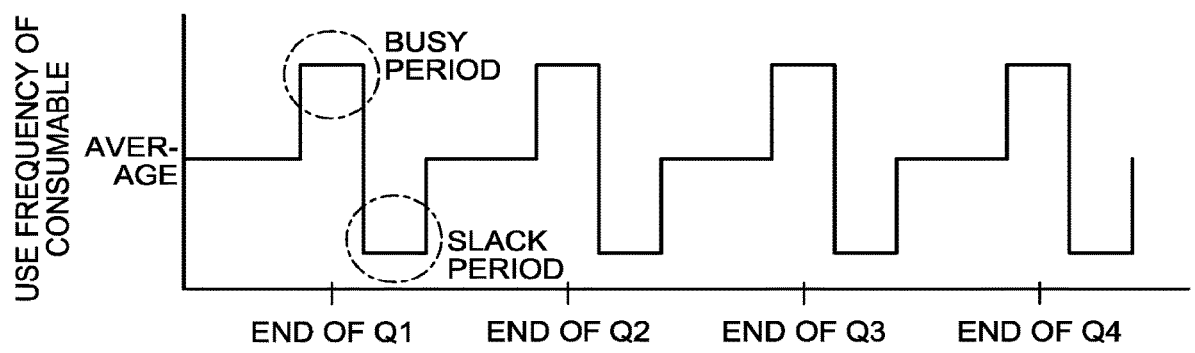
FIG. 5 is a diagram for explaining a use frequency of a consumable.
Figure 6:
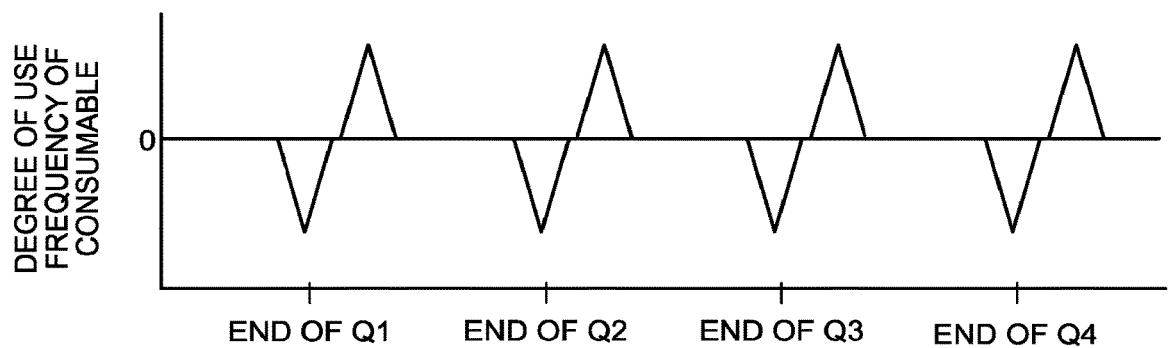
FIG. 6 is a diagram for explaining a degree of use frequency of the consumable.

FIG. 5 is a diagram for explaining a use frequency of the consumable. FIG. 6 is a diagram for explaining a degree of use frequency of the consumable.

For example, as illustrated in FIG. 5, there may be a case in which the use amount of the consumable 334 rises above an average (normal amount) at the end of every quarter of a year and falls below the average at the beginning of every quarter. In other words, the end of every quarter is a busy period in which the use frequency of the consumable 334 is higher than the average and the consumption speed is high, and the beginning of every quarter is a slack period in which the use frequency of the consumable 334 is lower than the average and the consumption speed is low.

With the use frequency of the consumable 334 as described above, as illustrated in FIG. 6, if a replacement day of the consumable 334 is predicted based on an average consumption speed (indicated by zero in FIG. 6) by averaging the use amounts of the consumable 334 in a year, the degree of use frequency varies depending on the busy period and the slack period and deviation occurs. Consequently, such a problem may occur that a replaceable consumable is out of stock when the replacement is needed in the busy period or that a replaceable consumable needs to be stocked in a limited storage space for a long time in the slack period.

Therefore, in the consumable management apparatus 500 of the first embodiment, the above-described problem is addressed by using a past use frequency of the consumable 334 with respect to a user (a user of the apparatus including the consumable 334).

Figure 7:
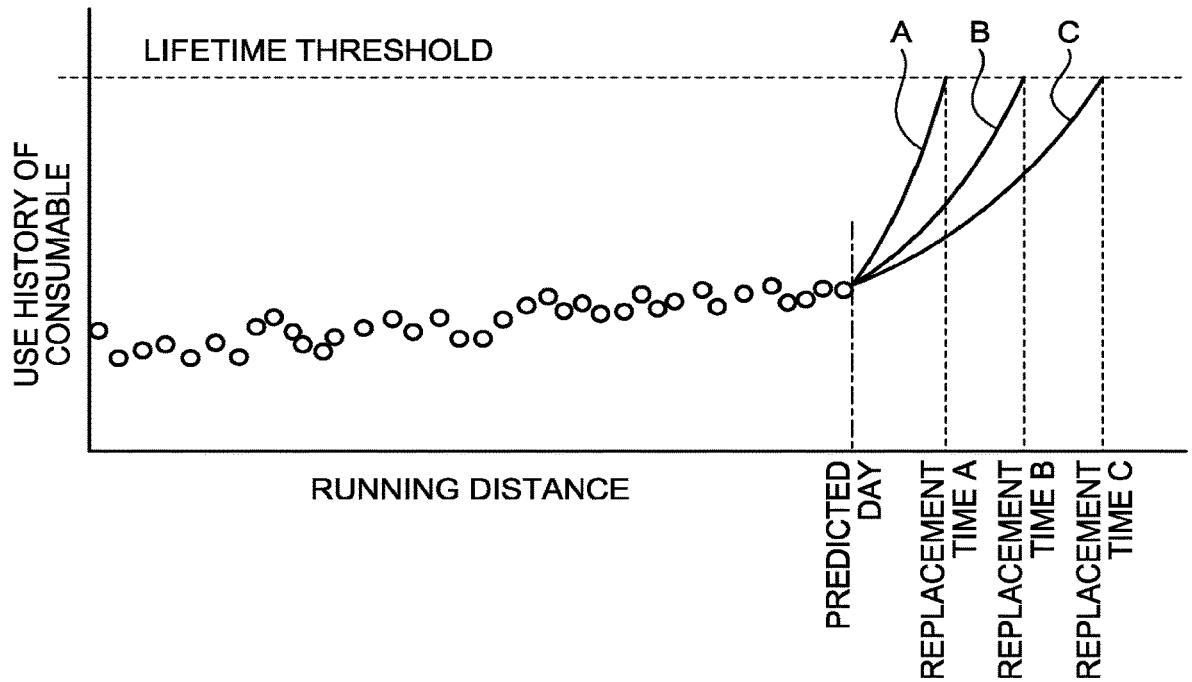
FIG. 7 is a diagram for explaining an example of operation performed by the consumable management apparatus according to the first embodiment.
Figure 8:
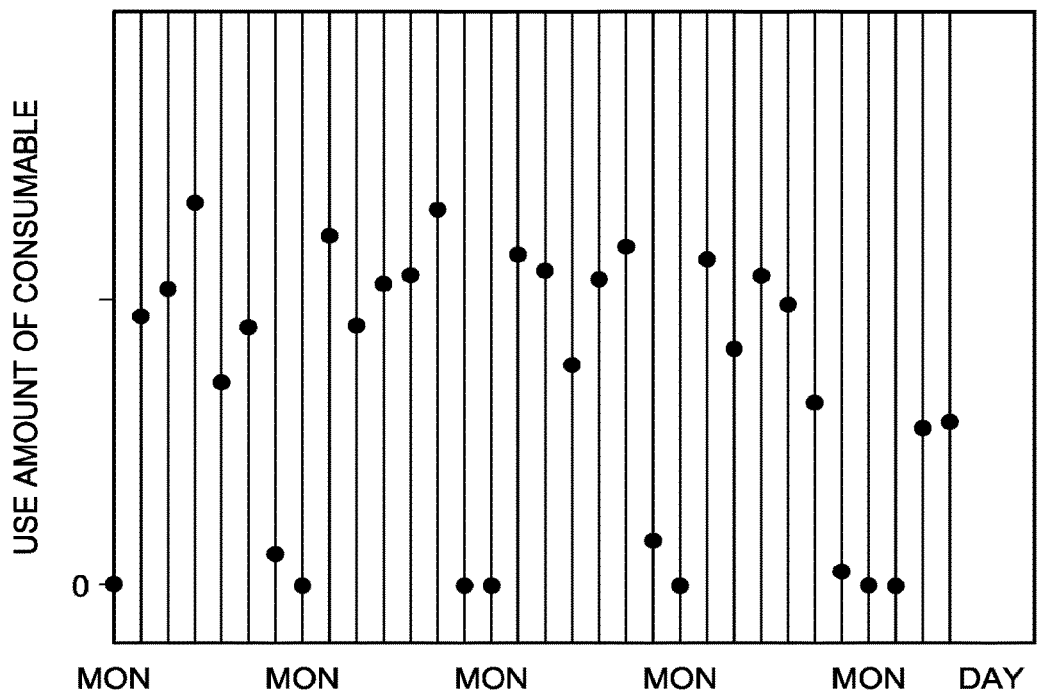
FIG. 8 is a diagram for explaining an example of a use history of the consumable.

An example of operation performed by the consumable management apparatus 500 will be described. FIG. 7 is a diagram for explaining an example of the operation performed by the consumable management apparatus 500 according to the first embodiment. FIG. 8 is a diagram for explaining an example of a use history of the consumable. FIG. 7 illustrates a use history of the consumable 334 and predicted replacement times, and FIG. 8 illustrates a change of the use amount (use history) of the consumable 334.

As illustrated in FIG. 7, in the use history of the consumable 334 obtained from the consumable sensor 331, a curve of the use history of the consumable 334 rises as the running distance increases and the replacement time approaches. Then, the replacement time of the consumable 334 comes when the running distance reaches up to a lifetime threshold.

In the rising curve of the use history of the consumable 334, inclination of the curve after a timing at which the rising curve starts (for example, a predicted day) is changed depending on the degree of user's use frequency of the consumable 334, and the replacement time is changed depending on the inclination. The predicted day is an arbitrary day near the replacement time, and can be set by an input device 332c. In FIG. 7, a rising curve A represents the usage (use amount) corresponding to the busy period in which the degree of use frequency is high, so that the consumption speed of the consumable 334 is the highest and a replacement time comes early (replacement time A). A rising curve C represents the usage (use amount) corresponding to the slack period in which the degree of use frequency is low, so that the consumption speed of the consumable 334 is the lowest and a replacement time comes slowly (replacement time C). A rising curve B represents the usage (use amount) in which the degree of use frequency is average, so that the consumption speed of the consumable 334 is average and a replacement time comes averagely (replacement time B).

The usage (use amount) of the consumable 334 in the busy period, the slack period, and an average period will be described below. The use amount of the consumable 334 is obtained such that "a running distance/s"="a total running distance/a running time count value", that is, the running distance is calculated per unit time. Meanwhile, if the running distance is calculated per day, the running distance is calculated such that "a total running distance/the number of days from a start day on which the consumable 334 is first used", so that a value is obtained including a day, such as a holiday, on which the apparatus is not used. However, with use of the running distance calculated per unit time, it is possible to exclude a holiday. Subsequently, a use amount of the consumable 334 in a certain period determined in advance within the use amount obtained as described above is stored in the consumable use history storage unit 330. The certain period is, for example, one week or one month as illustrated in FIG. 8. The certain period may be set by the input device 332c, is stored in the consumable use history storage unit 330, and is used by the consumable remaining amount calculating unit 332 in calculation of the use amount. Then, in the certain period, an average of use amounts of the top 20% is defined as a case of the busy period, an average of use amounts of the bottom 20% is defined as a case of the slack period, and an average of all pieces of data is defined as a case of the average period. Meanwhile, in the certain period illustrated in FIG. 8, the use amount of the consumable 334 changes in a one-week period. The user of the apparatus uses a small amount of the consumable on Sunday and Monday, and constantly uses a large amount of the consumable from Tuesday to Saturday. It may be possible to predict a future usage speed based on a pace of using the consumable 334 as described above. Then, the running distance (day) is calculated by "a running distance/s" for each case. In this case, one day is obtained by multiplication of an average operating time in each use period. In other words, the consumption speed of the consumable 334 in the certain period is calculated each of the cases of the busy period, the slack period, and the average period, on the basis of the use amount of the consumable 334 (the degree of use frequency of the consumable 334). This calculation is performed by the analyzing unit 332a of the consumable remaining amount calculating unit 332. Meanwhile, in the printer function of the image forming apparatus 300, the speed at which the consumable 334 is consumed is changed depending on a sheet printing direction (for example, A4 portrait or longitudinal), and the consumable 334 is consumed not only by printing but also by maintenance operation. Therefore, the use conditions of the consumable 334 as described above are set in advance by the input device 332c, stored in the consumable use history storage unit 330, and used by the consumable remaining amount calculating unit 332 in calculation of the use amount.

Then, if the use condition of the consumable 334 on or after the predicted day corresponds to the busy period illustrated in FIG. 5, the rising curve A illustrated in FIG. 7, which indicates the usage (use amount) corresponding to the busy period in which the degree of use frequency is high, is selected and applied, so that the replacement time A is predicted based on the rising curve A. Further, if the use condition of the consumable 334 on or after the predicted day corresponds to the slack period illustrated in FIG. 5, the rising curve C illustrated in FIG. 7, which indicates the usage (use amount) corresponding to the slack period in which the degree of use frequency is low, is selected and applied, so that the replacement time C is predicted based on the rising curve C. Furthermore, if the use condition of the consumable 334 on or after the predicted day corresponds to the average period illustrated in FIG. 5, the rising curve B illustrated in FIG. 7, which indicates the average degree of use frequency, is selected and applied, so that the replacement time B is predicted based on the rising curve B. This prediction is performed by the predicting unit 332b of the consumable remaining amount calculating unit 332. Further, in the prediction, by setting a use condition of the consumable 334 in advance such that a holiday (non-use day) of the user is set as an excluded day by the input device 332c and storing the use condition in the consumable use history storage unit 330, it is possible to predict a replacement time to be provided to the user while excluding the holiday. Then, the predicted consumable replacement time display unit 333 provides the predicted replacement time.

Figure 9:
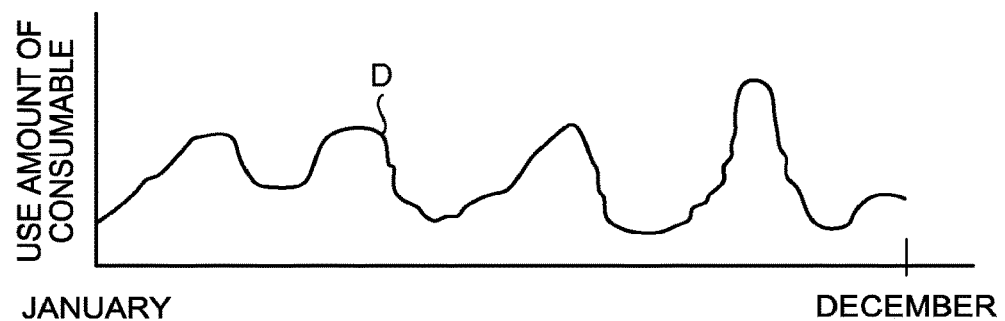
FIG. 9 is a diagram for explaining an example of the use history of the consumable.
Figure 10:
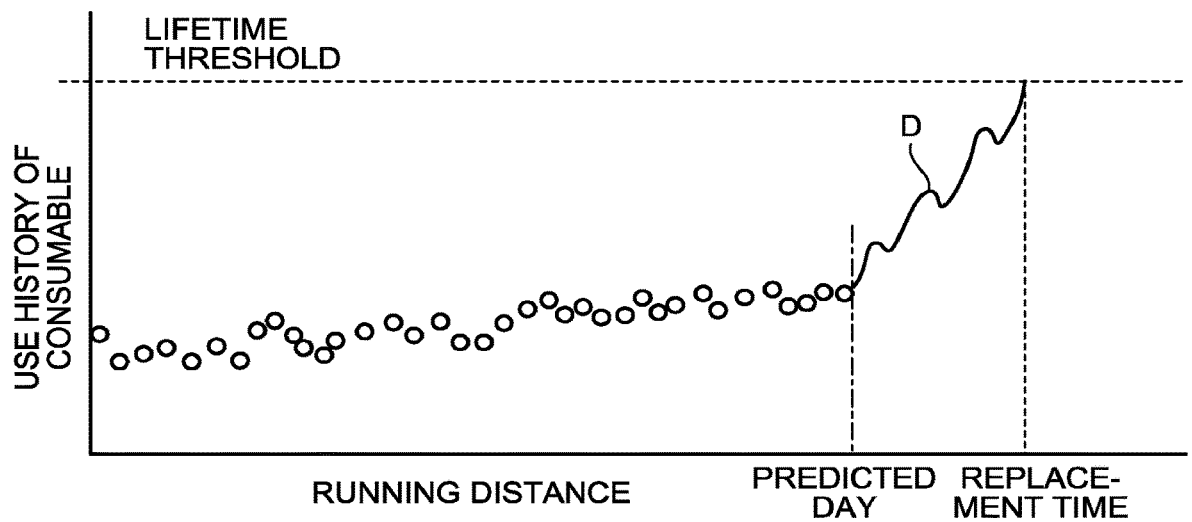
FIG. 10 is a diagram for explaining another example of the operation performed by the consumable management apparatus according to the first embodiment.

Another example of the operation performed by the consumable management apparatus 500 will be described below. FIG. 9 is a diagram for explaining an example of the use history of the consumable. FIG. 10 is a diagram for explaining another example of the operation performed by the consumable management apparatus 500 according to the first embodiment. FIG. 9 illustrates a change of the use amount (use history) of the consumable 334, and FIG. 10 illustrates prediction of the replacement time of the consumable 334.

As illustrated in FIG. 9, a change (use history) D of the use amount of the consumable 334 in a predetermined period in accordance with the degree of user's use frequency of the consumable 334 is stored in the consumable use history storage unit 330. FIG. 9 illustrates a history of the use amount of the consumable 334 in one year from January 1st to December 31st of the previous year in a case where the predicted day is January 1st. The change D of the use amount of the consumable 334 is measured by the consumable sensor 331 and stored in the consumable use history storage unit 330. The predicted day is an arbitrary day near the replacement time, can be set by the input device 332c, is stored in the consumable use history storage unit 330, and is used by the consumable remaining amount calculating unit 332 in calculation of the use amount. Further, the predetermined period can be set by the input device 332c, is stored in the consumable use history storage unit 330, and is used by the consumable remaining amount calculating unit 332 in calculation of the use amount. Then, the consumption speed of the consumable 334 is analyzed and calculated based on the degree of use frequency of the consumable 334 in the predetermined period, by using a change of the use amount of the consumable 334 in the predetermined period. This calculation is performed by the analyzing unit 332a of the consumable remaining amount calculating unit 332. Meanwhile, in the case of the predetermined period illustrated in FIG. 8, the use amount of the consumable 334 changes in a one-week period. The user of the apparatus uses a small amount of the consumable on Sunday and Monday, and constantly uses a large amount of the consumable from Tuesday to Saturday. It may be possible to predict a future usage speed based on a pace of using the consumable 334 as described above.

Then, as illustrated in FIG. 10, it is assumed that a change of the use amount of the consumable 334 on or after the predicted day is the same as the change of the use amount of the consumable 334 before the predicted day, and by using a consumption speed calculated from the change D of the use amount of the consumable 334 illustrated in FIG. 9 as the change D of the use amount of the consumable 334 on or after the predicted day illustrated in FIG. 10, a replacement time is predicted from a running distance that reaches a lifetime threshold of the consumable 334 based on the consumption speed. This prediction is performed by the predicting unit 332b of the consumable remaining amount calculating unit 332. Further, in the prediction, if the number of users who use the apparatus (the image forming apparatus 300) increases or decreases with respect to the predetermined period, by setting a use condition of the consumable 334 corresponding to the amount of increase or decrease in advance by the input device 332c and storing the use condition in the consumable use history storage unit 330, it is possible to predict a replacement time by taking into account the number of users in the consumption speed of the consumable 334 (for example, the consumption speed is increased 1.2 times if the number of users is increased by 20% with respect to the predetermined period). Further, in the prediction, by setting a use condition of the consumable 334 in advance such that a holiday (non-use day) of the user is set as an excluded day by the input device 332c and storing the use condition in the consumable use history storage unit 330, it is possible to predict a replacement time to be provided to the user while excluding the holiday. Then, the predicted consumable replacement time display unit 333 provides the predicted replacement time.

Figure 11:
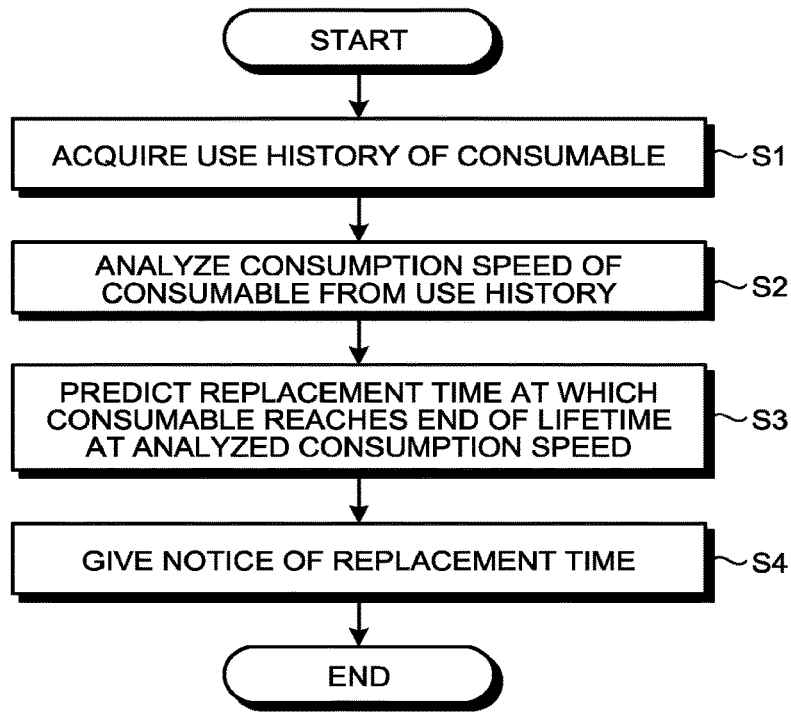
FIG. 11 is a flowchart illustrating an example of the flow of a process performed by the consumable management apparatus according to the first embodiment.

FIG. 11 is a flowchart illustrating an example of the flow of a process performed by the consumable management apparatus 500 according to the first embodiment. As the operation of the consumable management apparatus 500 illustrated in FIG. 7, FIG. 8, FIG. 9, and FIG. 10 as described above, as illustrated in FIG. 11, a use history of the consumable 334 that has been used by a user is acquired from the consumable use history storage unit 330 (Step S1). At Step S1, the use history includes a use condition of the consumable 334, such as a past use amount and a degree of past use frequency of the consumable 334, so that it is possible to acquire the use condition of the consumable 334 by acquiring the use history. Subsequently, the analyzing unit 332a of the consumable remaining amount calculating unit 332 analyzes a consumption speed of the consumable 334 from the use history of the consumable 334 acquired at Step S1 (Step S2). At Step S2, the consumption speed of the consumable 334 for the plurality of cases (the busy period, the slack period, and the average period) is analyzed on the basis of the degree of past use frequency of the consumable 334 acquired from the use history of the consumable 334 as described above. Alternatively, at Step S2, the consumption speed of the consumable 334 is analyzed on the basis of the degree of use frequency of the consumable 334 in a past predetermined period (for example, a period from the same day of a previous year as the predicted day to a day just before the predicted day) of the currently used consumable 334 from the use history of the consumable 334 as described above. Subsequently, the predicting unit 332b of the consumable remaining amount calculating unit 332 predicts a replacement time at which the consumable 334 reaches the end of its lifetime at the consumption speed of the consumable 334 analyzed at Step S2 (Step S3). At Step S3, it is possible to predict the replacement time by additionally taking into account the above-described use condition of the consumable 334, where the use condition is set in advance by the input device 332c and stored in the consumable use history storage unit 330. Subsequently, the predicted consumable replacement time display unit 333 gives a notice of the replacement time predicted at Step S3 (Step S4).

As described above, the consumable management apparatus 500 of the first embodiment includes the consumable sensor 331 (detecting means) that detects the use condition of the consumable 334, the consumable use history storage unit 330 (storing means) that stores therein the use history of the consumable 334, the analyzing unit 332a (analyzing means) of the consumable remaining amount calculating unit 332 that analyzes the consumption speed of the consumable 334 on the basis of the degree of use frequency of the consumable 334 obtained from the use history of the consumable 334 stored in the consumable use history storage unit 330, the predicting unit 332b (predicting means) of the consumable remaining amount calculating unit 332 that predicts a replacement time of the consumable 334 from the use condition of the consumable 334 detected by the consumable sensor 331 and the consumption speed of the consumable 334 analyzed by the analyzing unit 332a, and the predicted consumable replacement time display unit 333 (notifying means) that provides the replacement time of the consumable 334 predicted by the predicting unit 332b.

According to the consumable management apparatus 500, the consumption speed of the consumable 334 is analyzed based on the degree of use frequency of the consumable 334 obtained from the use history of the consumable 334, so that it is possible to obtain the consumption speed of the consumable 334 corresponding to the degree of use frequency of the consumable 334 in the busy period, the slack period, or the average period of the user, for example. Then, the replacement time of the consumable 334 is predicted from the use condition of the consumable 334 and the consumption speed of the consumable 334, so that it is possible to predict the replacement time of the consumable 334 by applying the consumption speed of the consumable 334 corresponding to the use condition of the currently used consumable 334. As a result, it is possible to present an appropriate replacement time of the consumable 334 to the user.

Furthermore, in the consumable management apparatus 500 of the first embodiment, it is preferable that the analyzing unit 332a analyzes the consumption speeds of the consumable 334 for the plurality of cases (for example, the busy period, the slack period, and the average period), on the basis of the degree of past use frequency of the consumable 334 that is obtained from the use history of the consumable 334 stored in the consumable use history storage unit 330, and the predicting unit 332b selectively applies the consumption speed of each of the cases depending on the use condition of the currently used consumable 334, and predicts the replacement time of the currently used consumable 334.

According to the consumable management apparatus 500 as described above, the consumption speeds of the consumable 334 for the plurality of cases are analyzed on the basis of the degree of past use frequency of the consumable 334, and the replacement time of the currently used consumable 334 is predicted by selectively applying the consumption speed of each of the cases corresponding to the use condition of the currently used consumable 334. Therefore, it is possible to present an appropriate replacement time of the consumable 334 to the user.

Here, it is preferable that the analyzing unit 332a analyzes the consumption speed of the consumable 334 on the basis of the degree of use frequency of the consumable 334 per unit time. This makes it possible to exclude a day, such as a holiday, on which the apparatus is not used, as compared to the case in which the degree of use frequency of the consumable 334 obtained per day is used for example. Therefore, it is possible to analyze an appropriate consumption speed of the consumable 334 depending on the user.

Furthermore, in the consumable management apparatus 500 of the first embodiment, it is preferable that the analyzing unit 332a analyzes the consumption speed of the consumable 334 on the basis of the degree of use frequency of the consumable 334 in a past predetermined period of the currently used consumable 334 from the use history of the consumable 334 stored in the consumable use history storage unit 330, and the predicting unit 332b predicts a replacement time of the currently used consumable from a consumption speed of the currently used consumable 334 in the past predetermined period.

According to the consumable management apparatus 500 as described above, for example, the consumption speed of the consumable 334 is predicted on the basis of the degree of use frequency of the consumable 334 in the past predetermined period, such as a period from the same day of the previous year as the predicted day to a day just before the predicted day, and the replacement time of the currently used consumable is predicted from the consumption speed in the past predetermined period. Therefore, it is possible to present an appropriate replacement time of the consumable 334 to the user.

Moreover, in the consumable management apparatus 500 of the first embodiment, it is preferable that, when a use condition of the consumable 334 is set, the analyzing unit 332a analyzes the consumption speed of the consumable 334 by further taking into account the set use condition.

According to the consumable management apparatus 500 as described above, by setting the user's use condition of the consumable 334 in advance, the consumption speed of the consumable 334 is analyzed by further taking into account the use condition. Therefore, it is possible to present a more appropriate replacement time of the consumable 334 to the user.

Furthermore, in the consumable management apparatus 500 of the first embodiment, it is preferable that, when the use condition of the consumable 334 is set, the predicting unit 332b predicts the replacement time of the consumable 334 by further taking into account the set use condition.

According to the consumable management apparatus 500 as described above, by setting the user's use condition of the consumable 334 in advance, the replacement time of the consumable 334 is predicted by further taking into account the use condition. Therefore, it is possible to present a more appropriate replacement time of the consumable 334 to the user.

Moreover, in the consumable management apparatus 500 of the first embodiment, it is preferable that the apparatus that uses the consumable 334 includes the consumable sensor 331, the consumable use history storage unit 330, the analyzing unit 332a, the predicting unit 332b, and the predicted consumable replacement time display unit 333.

According to the consumable management apparatus 500 as described above, it is possible to integrally manage the consumable 334 used in the apparatus.

Moreover, in the consumable management apparatus 500 of the first embodiment, it is preferable that the consumable sensor 331 is included in the apparatus that uses the consumable 334, the consumable use history storage unit 330, the analyzing unit 332a, and the predicting unit 332b are included in an externally connected apparatus (the external terminal 320 or the server 321), and the predicted consumable replacement time display unit 333 is include in the apparatus or the externally connected apparatus.

According to the consumable management apparatus 500 as described above, it is possible to distribute the functions to the apparatus that uses the consumable 334 and the externally connected apparatus, and manage the consumable 334 used in the apparatus.

Furthermore, in the consumable management apparatus 500 of the first embodiment, it is possible to apply, as the consumable 334, a component that is consumed by use and a component that is deteriorated by use.

Moreover, the image forming apparatus of the first embodiment includes the above-described consumable management apparatus 500.

According to the image forming apparatus as described above, it is possible to present, in the image forming apparatus, an appropriate replacement time of the consumable 334 to a user, and it possible to appropriately manage the consumable 334 for each user.

Furthermore, a consumable management method of the first embodiment includes a use condition acquisition step of acquiring the use condition of the consumable 334 (Step S1), a use history acquisition step of acquiring the use history of the consumable 334 (Step S1), an analysis step of analyzing the consumption speed of the consumable 334 on the basis of the degree of use frequency of the consumable 334 obtained from the use history of the consumable 334 (Step S2), a prediction step of predicting the replacement time of the consumable 334 from the use condition of the consumable 334 and the consumption speed of the consumable 334 (Step S3), and a notification step of giving a notice of the replacement time (Step S4).

According to the consumable management method as described above, the consumption speed of the consumable 334 is analyzed based on the degree of use frequency of the consumable 334 obtained from the use history of the consumable 334. Therefore, for example, it is possible to obtain the consumption speed of the consumable 334 corresponding to the degree of use frequency of the consumable 334 in the busy period, the slack period, or the average period of the user. Further, the replacement time of the consumable 334 is predicted from the use condition of the consumable 334 and the consumption speed of the consumable 334, so that it is possible to predict the replacement time of the consumable 334 by applying the consumption speed of the consumable 334 appropriate for the use condition of the currently used consumable 334. As a result, it is possible to present an appropriate replacement time of the consumable 334 to the user.

Moreover, a computer program of the first embodiment is a program that causes a computer to execute the use condition acquisition step of acquiring the use condition of the consumable 334 (Step S1), the use history acquisition step of acquiring the use history of the consumable 334 (Step S1), the analysis step of analyzing the consumption speed of the consumable 334 on the basis of the degree of use frequency of the consumable 334 obtained from the use history of the consumable 334 (Step S2), the prediction step of predicting the replacement time of the consumable 334 from the use condition of the consumable 334 and the consumption speed of the consumable 334 (Step S3), and the notification step of giving a notice of the replacement time (Step S4).

According to the program as described above, it is possible to cause a computer to execute each of the steps.

The program executed by the consumable management apparatus 500 of the first embodiment is provided to a storage device of the apparatus (the image forming apparatus 300) or the externally connected apparatus (the external terminal 320 or the server 321) that includes the consumable remaining amount calculating unit 332, by being recorded in a computer-readable recording medium, such as a CD-ROM, a flexible disk (FD), a CD-recordable (CD-R), or a digital versatile disk (DVD), in a computer-installable or computer-executable file format. Furthermore, the program executed by the consumable management apparatus 500 of the first embodiment may be stored in a computer connected to a network, such as the Internet, and provided by being downloaded via the network. Moreover, the program executed by the consumable management apparatus 500 of the first embodiment may be provided or distributed via a network, such as the Internet. Furthermore, the program executed by the consumable management apparatus 500 of the first embodiment may be provided by being incorporated in a ROM or the like in advance.

The program executed by the consumable management apparatus 500 of the first embodiment has a module structure including the analyzing unit 332a and the predicting unit 332b as described above. As actual hardware, by causing a CPU (processor) to read the program from the above-described storage device and execute the program, the analyzing unit 332a and the predicting unit 332b are loaded on a storage device and generated on the storage device.

Second Embodiment

Next, a second embodiment will be described.

The second embodiment is different from the first embodiment in that, when presenting an appropriate replacement time of a consumable, an available remaining amount is predicted depending on a use state of a user, and an appropriate replacement time of the consumable is provided based on a prediction result. In the following description of the second embodiment, differences from the first embodiment will be described and the same explanation as those of the first embodiment will be omitted.

In an image forming apparatus, such as a multifunction peripheral (MFP), a method of managing remaining amounts of components and consumables that have lives, predicting available remaining amounts (remaining available times, remaining printable amounts, or the like), and presenting a prediction result to a user has been known.

For example, Japanese Laid-open Patent Publication No. 2009-140012 discloses a print system that predicts a number of printable sheets, a number of printable orders, a printable time, or the like, on the basis of remaining amount information on a consumable, such as ink or sheet, which is consumed by execution of printing, and displays a prediction result in a graph. Further, Japanese Laid-open Patent Publication No. 2013-11674 discloses an image forming apparatus that calculates a lifetime (a number of remaining printable sheets or remaining operating days) of a consumable on the basis of a function durable amount that is an upper limit of an operating amount and on the basis of an amount of operation of the consumable and the number of printed sheets or the number of operating days from when the consumable is mounted to a current time, and displays the calculated lifetime.

However, in the conventional lifetime prediction, variation of the use amount of the component or the consumable due to the way of using the apparatus after the prediction is not reflected, so that the prediction result may be deviated from the actual use state of the user, and it becomes difficult for the user to accurately recognize an available remaining amount and a replace time of the component.

The above-described problem occurs not only in the image forming apparatus but also in apparatuses used in other fields, such as a robot and an amusement device, which has a component or a consumable that has a life.

The second embodiment has been conceived in view of the above-described circumstances, and an object is to predict an available remaining amount in accordance with an actual use state of a user.

Figure 12:
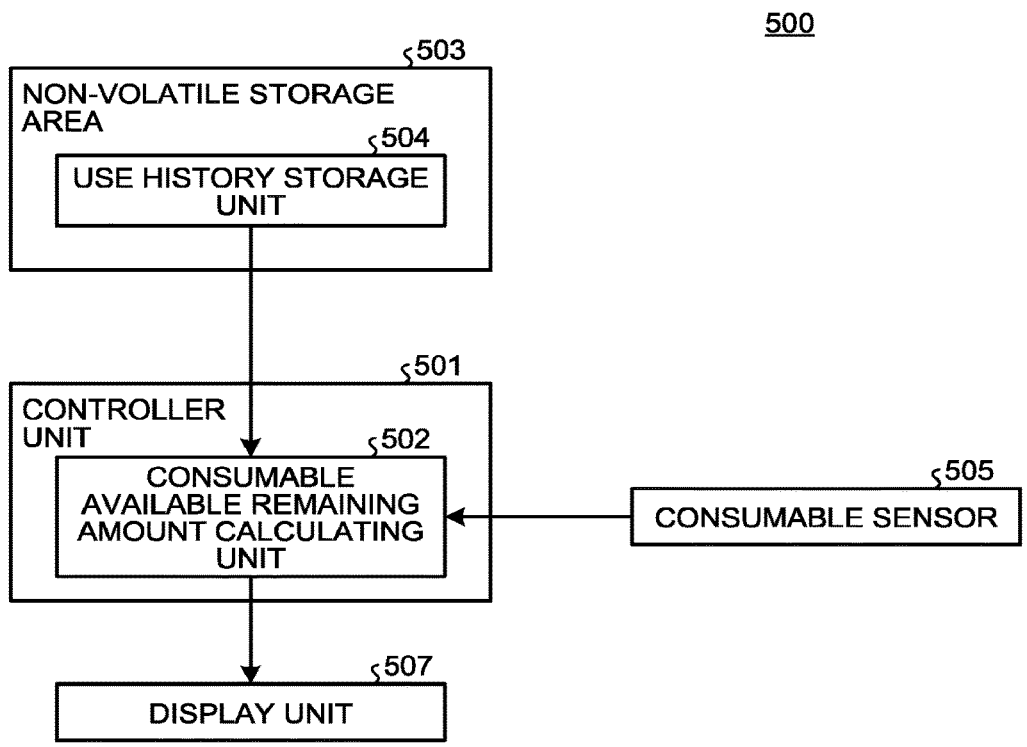
FIG. 12 is a block diagram of a consumable management apparatus according to a second embodiment.

FIG. 12 is a block diagram of the consumable management apparatus 500 that is configured in the consumable management system 1000 according to the second embodiment and that predicts an available remaining amount of a consumable. As illustrated in FIG. 12, the consumable management apparatus 500 includes a controller unit 501, a consumable available remaining amount calculating unit 502, a non-volatile storage area 503, a use history storage unit 504, a consumable sensor 505, and a display unit 507.

The controller unit 501 is configured with, for example, a CPU, a memory (a ROM or a RAM), and the like, and controls the entire operation of the consumable management apparatus 500 by causing the CPU to execute a program stored in the ROM or the like using the RAM as a work area.

The consumable available remaining amount calculating unit 502 is a part of the analyzing unit 332a (analyzing means) illustrated in FIG. 4, and is a functional unit that calculates the available remaining amount of the consumable on the basis of information received from the consumable sensor 505 and the use history storage unit 504. The consumable available remaining amount calculating unit 502 is implemented by, for example, a program that is executed by the CPU of the controller unit 501. The consumable available remaining amount calculating unit 502 is included in at least one of the image forming apparatus 300 and the server 321 illustrated in FIG. 3. If included in the image forming apparatus 300, the consumable available remaining amount calculating unit 502 causes a controller unit of the image forming apparatus 300 to calculate the available remaining amount of the consumable on the basis of the information received from the consumable sensor 505 and the use history storage unit 504. If included in the server 321, the consumable available remaining amount calculating unit 502 causes a controller unit of the server 321 that is connected to the image forming apparatus 300 via the network 322, on the basis of the information received from the consumable sensor 505 and the use history storage unit 504.

The non-volatile storage area 503 is for storing a consumable use history of a user in the use history storage unit 504. As the non-volatile storage area 503, a storage medium, such as an HDD or a memory, may be used.

The use history storage unit 504 stores therein a use history of the user. The use history of the user includes not only a use history of a consumable, such as sheet or toner, but also a use history of the image forming apparatus 300, such as a type of a print job executed in the image forming apparatus 300 by the user. This history is not cleared even after the consumable is replaced. Further, a past use history is not present in a new machine, and if a user uses a consumable at a high pace, it is difficult to appropriately predict a replacement time of the consumable. Therefore, it is possible to set, in the use history storage unit 504, pseudo consumable use history data (for example, pseudo data prepared for each business type, or the like) from outside. The use history storage unit 504 is included in at least one of the image forming apparatus 300 and the server 321. If included in the image forming apparatus 300, the use history storage unit 504 stores the consumable use history of the user in the non-volatile storage area 503 inside the image forming apparatus 300. If included in the server 321, the use history storage unit 504 stores the consumable use history of the user in the non-volatile storage area 503 inside the server 321.

The consumable sensor 505 is a sensor that is mounted on the image forming apparatus 300 and directly or indirectly measures a use amount or a remaining amount of a consumable. The consumable sensor 505 is not limited to hardware, and may be data in the apparatus. For example, data about the number of print-out sheets in the image forming apparatus may serve as the consumable sensor. A measurement result obtained by the consumable sensor 505 is sent to the consumable available remaining amount calculating unit 502. The number of the consumable sensors 505 is not limited to one, and it may be possible to provide a plurality of consumable sensors.

The display unit 507 is configured with a display device, such as a liquid crystal display (LCD), and displays a calculation result obtained by the consumable available remaining amount calculating unit 502. The display unit 507 is included in at least one of the image forming apparatus 300 and the external terminal 320. If included in the image forming apparatus 300, the display unit 507 displays a calculation result obtained by the consumable available remaining amount calculating unit 502 that is included in the image forming apparatus 300. If included in the external terminal 320, the display unit 507 receives and displays a calculation result obtained by the consumable available remaining amount calculating unit 502 that is included in the image forming apparatus 300 or the server 321, or displays a calculation result obtained by the consumable available remaining amount calculating unit 502 that is included in the external terminal 320.

A method of calculating an available remaining amount of a consumable used in the image forming apparatus 300 will be described below. The consumable used in the image forming apparatus 300 includes a component that is deteriorated over time by use of the image forming apparatus, in addition to toner and sheet. Examples of the component that is deteriorated over time include a developing unit that performs an electrophotographic process in the image forming apparatus and a component of a driving system whose performance is deteriorated by use. In the second embodiment, an example will be described in which an available remaining amount of the developing unit of the image forming apparatus is predicted.

Figure 13:
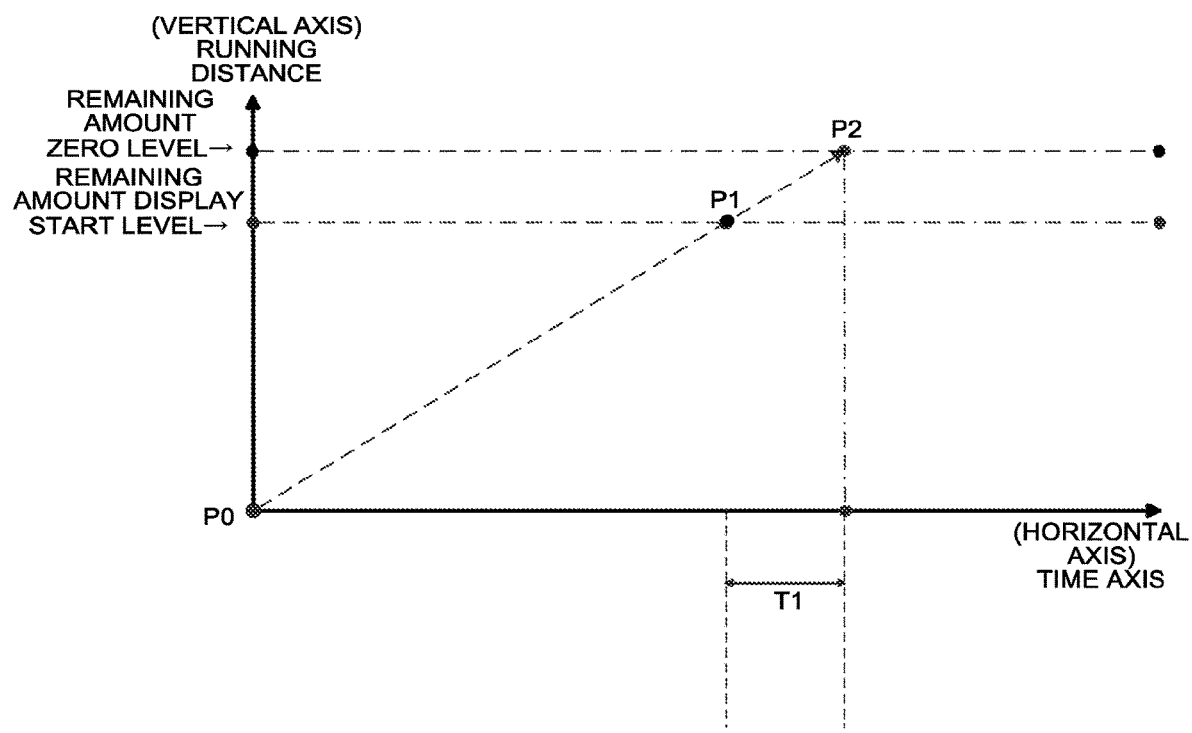
FIG. 13 is a diagram for explaining the way of displaying a remaining amount from a predetermined time until replacement when a replacement time of the consumable is approaching.

First, the way of displaying the remaining mount of the consumable from a predetermined time to replacement when the replacement time of the consumable (developing unit) is approaching will be described with reference to FIG. 13. Here, the way of displaying the replacement time of the developing unit by converting a remaining amount to be displayed into the number of remaining printable sheets by assuming a print condition of a user while using an operating time of the developing unit, i.e., a motor driving time (running distance) of the developing unit, as a basis for the measurement will be described. For example, it is assumed that the number of sheets to be printed per print job by a user of the image forming apparatus 300 is ten. In the case of a device configured such that a driving time of the developing unit is determined depending on a print time that is needed to print ten sheets and an adjustment time that is needed to maintain image quality, it is possible to predict a remaining amount display start level (remaining amount display start time P1) and a remaining amount zero level, i.e., a replacement time P2 of the developing unit that is a consumable, from a use start point P0 on the basis of the print condition. A period from the remaining amount display start time P1 to the replacement time P2 is a remaining amount display period T1.

Next, a basic concept of a job of the image forming apparatus 300 will be described with reference to FIGS. 14A, 14B, and 14C. In the image forming apparatus having the electrophotographic process, if printing related to a job is divided by mode types, it is possible to divide a time into an activation time for activating a high-voltage system at the start of the job, a time for printing, such as developing and fixing, and a deactivation time for deactivating the activated high-voltage system at the end of the job. The activation process and the deactivation process are modes that are included at the beginning and the end of the job, and therefore, as the number of sheets to be printed per print job is increased, an average driving time (running distance) per sheet is reduced.

FIGS. 14A, 14B, and 14C are diagrams for explaining a relationship between the number of sheets to be printed per print job and a driving time of the developing unit needed to execute the job. In printing of one sheet per job as illustrated in FIG. 14A, the activation process and the deactivation process are performed for each sheet. Therefore, a time (running distance) needed (consumed) per sheet in the printing of one sheet per job is obtained such that the activation time (1 second)+the image forming time (1.5 seconds)+the deactivation time (1.5 seconds)=4 seconds. In printing of two sheets per job as illustrated in FIG. 14B, the activation process and the termination process are performed every two sheets. Therefore, a time needed for the printing of two sheets per job is obtained such that the activation time (1 second)+the image forming time (1.5 seconds×2 sheets)+ the deactivation time (1.5 seconds)=5.5 seconds, and an average time for each sheet is obtained such that 5.5/2=2.75 seconds. In printing of five sheets per job as illustrated in FIG. 14C, the activation process and the deactivation process are performed every five sheets. Therefore, a time needed for the printing of five sheets per job is obtained such that the activation time (1 second)+the image forming time (1.5 seconds×5 sheets)+the deactivation time (1.5 seconds) =10 seconds, and an average time for each sheet is obtained such that 10/5=2 seconds. Therefore, while the time (running distance) consumed per sheet in the printing of one sheet per job is 4 seconds, the time (running distance) consumed per sheet in the printing of five sheets per job is 2 seconds and the degree of consumption per sheet is reduced to half.

In this manner, by calculating the degree of consumption based on the driving time of the developing unit per sheet, which is calculated from the relationship between the number of sheets to be printed per print job and the driving time of the developing unit, it is possible to reflect the user's usage (use history of the user) in prediction of a remaining life of the consumable. Further, with use of the relationships as described above, it is possible to calculate the number of available sheets when performing each print job on the basis of the driving time (operating time) of the developing unit, so that it is possible to perform conversion to the number of remaining available sheets by predicting a time taken to reach the replacement time of the developing unit.

Next, a running time obtained when an adjustment mode is further taking into account in the print job of the image forming apparatus 300 will be described with reference to FIG. 15. The adjustment mode is a mode that is executed to maintain image quality when the number of printed sheets exceeds a predetermined value, and that is for adjusting a potential around the electrophotographic process while maintaining a driving state at the end of printing (end of the job). Therefore, even when the print mode is terminated, the adjustment mode is executed and thereafter the deactivation process is performed, so that the running distance is increased by the adjustment mode. FIG. 15 illustrates a running time (running distance) that is needed to print six sheets in the print modes of one sheet per job, two sheets per job, and five sheets per job, assuming that the adjustment mode is executed when six or more sheets are printed. A section (a) of FIG. 15 illustrates an example in which printing is performed in the print mode of one sheet per job, six jobs are performed until the sixth sheet is printed, and the adjustment mode is executed after the end of the sixth job. A section (b) of FIG. 15 illustrates an example in which printing is performed in the print mode of two sheets per job, three jobs are performed until the sixth sheet is printed, and the adjustment mode is executed after the end of the third job. A section (c) of FIG. 15 illustrates an example in which printing is performed in the print mode of five sheets per job, and the adjustment mode is executed after the tenth sheet is printed at the end of the second job because the sixth sheet is included in the second job in the middle of the printing of six sheets.

In printing of N sheets per job, an adjustment mode average time (running distance) TH needed per sheet when the adjustment mode of an execution time T (seconds) is executed once every M (sheets) is calculated by Equation (1) below.

$$TH = T/(C \times N) \tag{1}$$

C in Equation (1) is a value obtained by rounding a result of division of M/N off to the nearest whole number, as defined by Equation (2) below.

$$C = \mathrm{ROUNDUP}(M/N, 0) \tag{2}$$

This will be described in detail below using the example illustrated in the section (b) of FIG. 15. As illustrated in the section (b) of FIG. 15, the adjustment mode is executed once every M=6 (sheets), the print mode is executed such that N=2 (sheets per job)=5.5 seconds, and, if the adjustment mode execution time T=5 seconds, C is obtained such that 6 (sheets)/2 (sheets per job)=3, so that the adjustment mode of the execution time T=5 seconds is executed once every three jobs and the average time TH is obtained such that TH=5/(3×2)=0.83 seconds. The driving time (running distance) needed for each sheet in the printing of two sheets per job is 5.5 seconds/2 sheets=2.75 seconds, so that the driving time (running time) needed for each sheet with the execution of the adjustment mode taken into account in the printing of two sheets per job is obtained such that 2.75 seconds+0.83 seconds=3.58 seconds.

If the available remaining amount of the consumable is converted into the number of sheets, it is possible to obtain a more appropriate number of remaining sheets by performing conversion while taking into account the time needed for the adjustment mode as described above.

Next, a method of calculating (predicting) the available remaining amount of the consumable used in the image forming apparatus 300 will be described with reference to FIG. 16. FIG. 16 is a graph illustrating a relationship between the degree of consumption (running distance) of the consumable and a use time. FIG. 16 illustrates a period in which an available remaining amount is re-examined depending on the latest use condition of a user at a time at which the available remaining amount display start time comes, and the available remaining amount is displayed as the number of remaining sheets in an image forming apparatus in which a replacement time is set based on the assumption of a predetermined usage environment.

A solid line L1 (P0→P1→P2) in FIG. 16 is a prediction line indicating a predicted remaining amount that is predicted before start of use (at the time of shipment), a dotted line L2 (P0→P4→P3→P5) is a first past result line indicating a past result remaining amount in a case where a user with a low use efficiency has used the consumable, and a chain line L3 (P0→P4'→P3') is a second past result line indicating a different past result in a case where a user with a high use efficiency has used the consumable. In FIG. 16, a period T1 is a remaining amount display period that is initially predicted, periods T2 and T2' are actual remaining amount display periods, periods T3 and T3' are predetermined use periods (for example, three days) back from the time at which the remaining amount display start level is obtained, periods T4 and T4' are differences between the remaining amount display start times due to correction, and periods 15 and T5' are differences between replacement times due to correction.

On the line L2, a time taken from a time P4 to a time P3 and a running distance (an operating time or a degree of consumption of the consumable) are calculated based on an interval line L2' from the time P3 at which the remaining amount display start level is obtained to the time P4 that is a certain period T3 (for example, three days) before the time P3. As a result, a time at which the remaining amount zero level is obtained is corrected from a time P2 that is on the initial prediction line L1 to a time P5 that is on the past result line L2, and a time taken from the remaining amount display start time P3 to the remaining amount zero level arrival time (the replacement time arrival time) P5 is converted to the number of printable sheets by taking into account the adjustment mode that may occur, in addition to taking into account the print mode.

Similarly to the past result line L2, as for the past result line L3 with respect to the user with the high use efficiency, a time taken from a time P4' to a time P3' and a running distance (the degree of consumption of the consumable) are calculated from an interval line L3' from the time P3' at which the remaining amount display start level is obtained to the time P4' that is a certain period T3' (for example, three days) before the time P3'. Based on the calculation result, a time at which the remaining amount zero level is obtained is corrected from the time P2 that is on the initial prediction line L1 to the time P5' that is on the past result line L3, and a time taken from the remaining amount display start time P3' to the time P5' is converted to the number of printable sheets by taking into account the adjustment mode that may occur, in addition to taking into account the print mode.

As a conversion method, a driving time of the developing unit per sheet in a single print job is calculated when the remaining amount display start level is obtained, on the basis of a relationship between the number of printed sheets to be output per print job in a predetermined period that is set in advance and a driving time of the developing unit needed to perform the single print job including the image quality adjustment mode or the like. Then, a time taken to the replacement time of the developing unit is converted to the number of printable sheets that are available until the replacement time, on the basis of the driving time per sheet. Thereafter, the converted number of remaining printable sheets is stored and displayed on the display unit 507.

As the user's use history used to calculate the available remaining amount, it may be possible to use other print conditions, such as a color mode (to-be-used color mode, such as monochrome, mono-color, two color, or full color), a sheet size (A4, A3, postcard, or the like), the number of pages to be combined in a single sheet (single-sided printing, double-sided printing, 2-in-1 (two pages in one side), 4-in-1 (4 pages in one side)), and combination of the above, in addition to the number of sheets to be printed per print job of the user. Further, it may be possible to calculate the number of printable sheets for each of the print conditions, and display a result of the number of remaining printable sheets for each of the print conditions. For example, if it is assumed that weighting of a consumption rate of the color mode is 4, the amount of consumption is calculated using weighting of 1 in the case of the monochrome mode, and, if it is assumed that weighting of a consumption rate of the single-sided printing is 1, the amount of consumption is calculated using weighting of ½ in the case of the double-sided mode, weighting of ½ in the case of 2-in-1, and weighting of ¼ in the case of 4-in-1, and the available remaining amount, i.e., the number of remaining sheets, is displayed for each of the conditions.

Furthermore, in the example of the past result line L3 in FIG. 16, the use efficiency of the user is higher than a use efficiency that is assumed at the time the machine is delivered (for example, when an actual use efficiency of the user is 40 sheets per job, while the assumed use efficiency is 10 sheets per job), P3' serves as the remaining amount display start time, and the actual remaining amount display period T2' until the time P5', at which the remaining amount zero level is obtained, is extremely increased as compared to the initially planned time. In this case, the number of remaining sheets is continuously displayed to the user although such display is not necessary. Therefore, it may be possible to set a threshold for the remaining amount display period T2' such that the setting of the threshold can be changed, and if the threshold is exceeded, it may be possible to delay the display start time of the number of remaining printable sheets. For example, if the period T2' exceeds the threshold, the remaining amount display is started at a half of the period T2'. The display start time is changed by the controller unit 410.

As described above, according to the second embodiment, in an electrophotographic image forming apparatus that measures a lifetime of a consumable based on a driving time, a driving time per sheet is calculated by assuming the number of sheets to be printed per job, and the available remaining amount until the end of the lifetime is displayed using the number of sheets as the remaining amount display near the replacement time, so that it is possible to notify a user of the replacement time in an easily understandable manner. Further, the number of sheets to be printed per job is re-calculated based on the latest printing volume of the user and converted to a driving time per sheet, so that it is possible to improve the accuracy of the number of sheets remaining until the end of the lifetime.

Furthermore, a use history, such as an actual print condition, of the image forming apparatus is used to predict the available remaining amount of the consumable, such as a component; therefore, it is possible to take into account a change of the user's use condition, so that it is possible to predict the available remaining amount in accordance with the user's actual use state. Consequently, it is possible to present information indicating the available remaining amount with high accuracy to the user, so that the user is able to determine whether to use the remaining component and determine a timing to replace the component with high accuracy.

Figure 17:
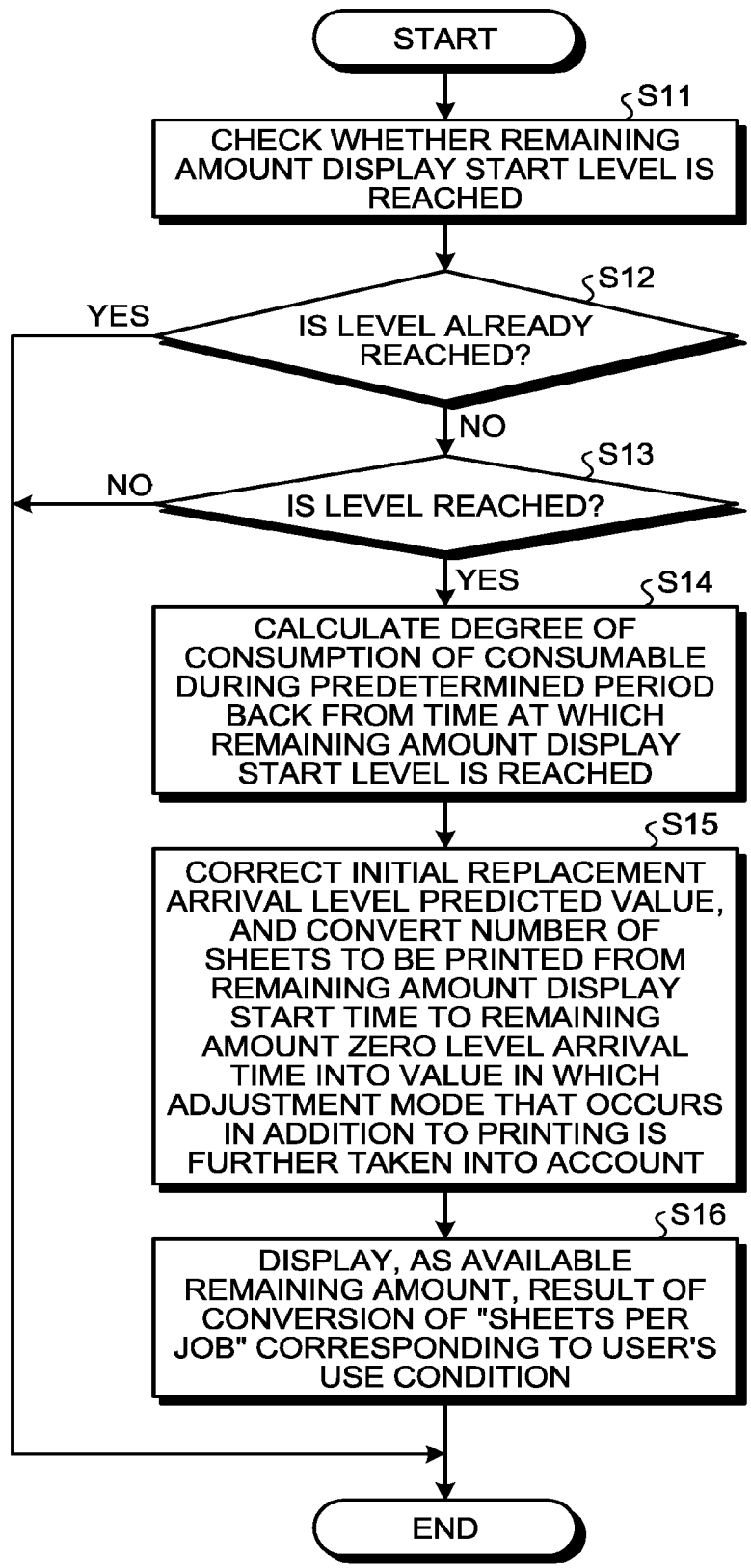
FIG. 17 is a flowchart illustrating the flow of a process performed by the consumable management apparatus for predicting the available remaining amount.

FIG. 17 is a flowchart illustrating the flow of a process performed by the consumable management apparatus 500 for predicting the available remaining amount. The available remaining amount is predicted in a predetermined cycle during a period in which a component (for example, a driving motor) related to the running distance (the degree of consumption of the consumable) is driving.

First, the consumable available remaining amount calculating unit 502 of the consumable management apparatus 500 checks whether the remaining amount display start level is already reached (Step S11). In the example in FIG. 16, when the actual use efficiency of the user is low (for example, the use efficiency is two sheets per job) relative to the use efficiency assumed at the time the machine is delivered (for example, the use efficiency is 10 sheets per job), it is checked whether the time P3 has already come, or, when the actual use efficiency of the user is high (for example, the use efficiency is 20 sheets per job) relative to the assumed use efficiency, it is checked whether the time P3' has already come.

If the remaining amount display start level is already reached (YES at Step S12), that is, if the time P3 or the time P3' has already come, the consumable available remaining amount calculating unit 502 terminates the flow. If the remaining amount display start level is not reached (NO at Step S12), the consumable available remaining amount calculating unit 502 checks whether the remaining amount display start level is reached (Step S13), and if the remaining amount display start level is not reached (NO at Step S13), the process is terminated. If the remaining amount display start level is reached (YES at Step S13), that is, if the time P3 or the time P3' has come, the process proceeds to Step S14.

At Step S14, the consumable available remaining amount calculating unit 502 calculates the degree of consumption of the consumable during a predetermined period (for example, three days) back from the time at which the remaining amount display start level is reached. In the example illustrated in FIG. 16, on the line L2, a time taken from the time P4 to the time P3 and the running distance (the degree of consumption of the consumable) are calculated from the interval line L2' between the time P3 at which the remaining amount display start level is reached and the time P4 that is the certain period T3 (for example, three days) before the time P3.

Subsequently, the consumable available remaining amount calculating unit 502 corrects an initial replacement arrival level predicted value based on the calculation result obtained at Step S14, and converts the number of sheets to be printed from the remaining amount display start time to the remaining amount zero level arrival time into a value in which the adjustment mode that occurs in addition to the printing is further taken into account (Step S15). In the example illustrated in FIG. 16, a time at which the remaining amount zero level is reached is corrected, on the basis of the calculation result, from the time P2 on the initial prediction line L1 to the time P5 on the past result line L2, and the number of sheets to be printed from the time P3 to the time P5 on the past result line L2 is converted to a value in which the adjustment mode that occurs in addition to the printing is further taken into account.

Subsequently, the consumable available remaining amount calculating unit 502 displays, as the available remaining amount, a result of conversion of "sheets per job" corresponding to the user's use condition on the display unit 507 (Step S16), and terminates the prediction process.

Figure 18:
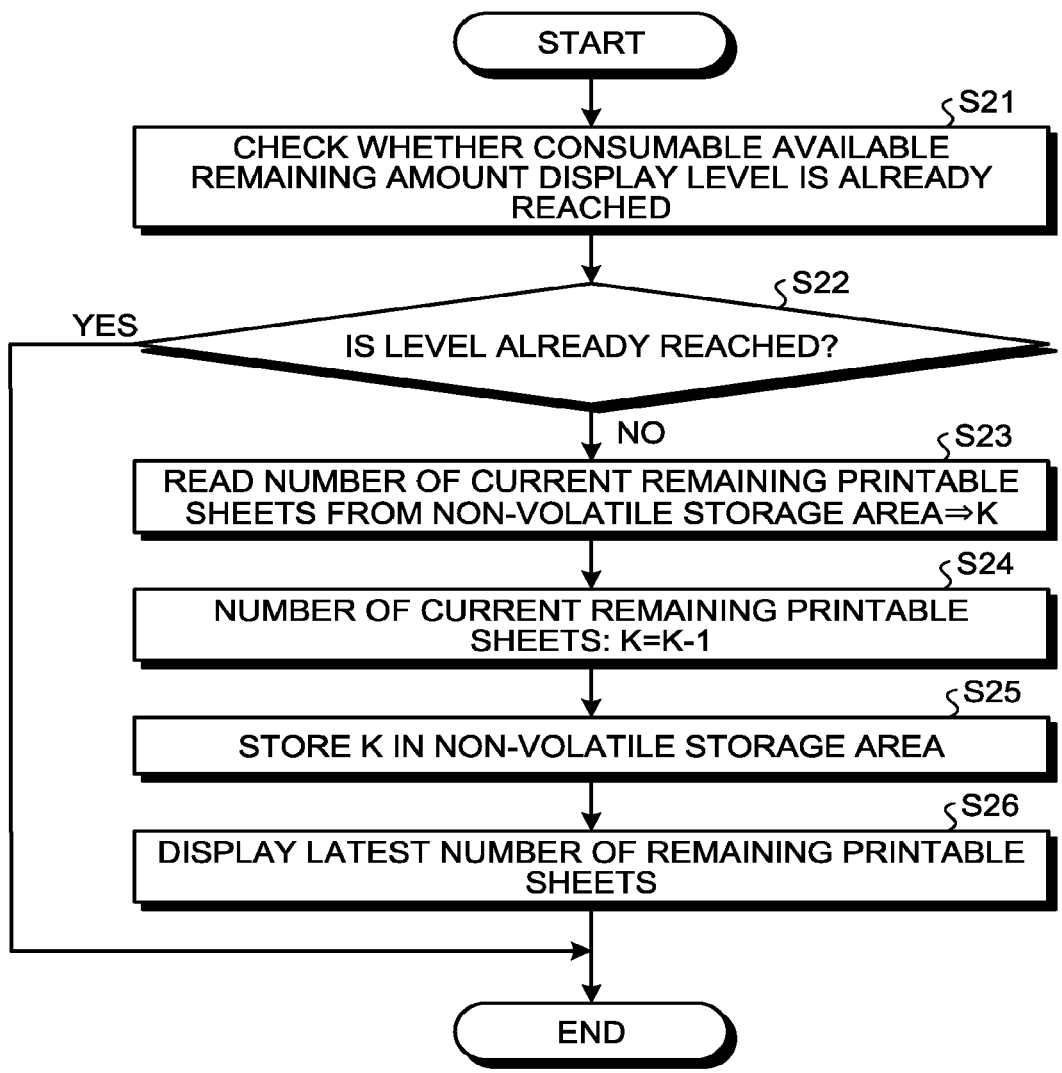
FIG. 18 is a flowchart illustrating the flow of a process performed by the consumable management apparatus for counting and displaying the available remaining amount after a time for displaying the available remaining amount has come.

FIG. 18 is a flowchart illustrating the flow of a process performed by the consumable management apparatus 500 for counting and displaying the available remaining amount (the number of remaining printable sheets) after a time for displaying the available remaining amount has come. This process is performed every time printing of one sheet is completed. First, the controller unit 501 of the consumable management apparatus 500 checks whether the consumable available remaining amount display level is already reached (Step S21).

If the available remaining amount display level is already reached (YES at Step S22), the controller unit 501 terminates the process. If the available remaining amount display level is not reached (NO at Step S22), the process proceeds to Step S23.

At Step S23, the controller unit 501 reads a count value K of the number of current remaining printable sheets from the non-volatile storage area 503.

Subsequently, the controller unit 501 decrements the count value K of the number of current remaining printable sheets by one (Step S24), and stores the decremented count value in the non-volatile storage area 503 (Step S25).

Then, the controller unit 501 displays the latest number of remaining printable sheets on the display unit 507 (Step S26), and terminates the process.

FIG. 19 illustrates an example of a screen displayed on the display unit 507. An example of the screen displayed on the display unit 507 is illustrated in FIG. 19. The screen for displaying the number of remaining printable sheets is not limited to the example illustrated in FIG. 19, and it may be possible to display the numbers of remaining printable sheets for respective conditions, such as a sheet size and a color mode, side by side.

Next, an example of a method of converting a motor driving time (running time) of the developing unit for each print job into the number of sheets when the developing unit is used as a consumable of the image forming apparatus will be described.

Specification of Image Forming Apparatus (MFP)
Time needed to print one sheet (first copy out time (FCOT)):
    4 seconds (corresponding to a running distance (time) in the case of printing of one sheet per job)
The number of sheets to be printed per minute in continuous printing (CPM): 40 sheets
Base for conversion of a running distance (the number of assumed sheets per job): 10 sheets per job
Image quality adjustment mode: adjustment (running driving) of T=about 10 seconds is performed once every M=100 sheets or more An example of conversion performed by the image forming apparatus configured as described above, at a time at which a remaining running distance reaches 2,000 seconds, such that the remaining display is changed to the number of remaining sheets based on the use condition adopted in the last three days will be described below.
1) In the case of 40 CPM, a driving time needed for one sheet in continuous printing is obtained such that 60 seconds/40 CMP=1.5 seconds per sheet.

2) Average driving time per sheet with respect to the number of sheets to be converted for a single job
2-1) In the case of an MFP using ten sheets per job as the base for consumable conversion, a time needed to copy ten sheets is obtained such that the first sheet (4 seconds)+9 sheets (1.5 seconds×9 sheets)=17.5 seconds (see FIG. 14). 17.5 seconds are converted to 10 pages, so that a time needed for each sheet is obtained such that 17.5/10=1.75 seconds. Similarly, a time (running distance) needed for each sheet in each of "sheets per job" modes is described in Table 1 below.
3) Average driving time per sheet with respect to the number of sheets to be converted for a single job with an adjustment mode execution time taken into account
3-1) When an adjustment mode execution time (adjustment of T=about 10 seconds is performed once every M=100 sheets or more) is taken into account, a value that is obtained by adding 0.1 second to the time obtained through Equations (1) and (2) above is obtained. A time (running distance) needed for each sheet in each of "sheets per job" modes with the adjustment mode is taken into account is described in Table 1 below.

When the number of printed sheets with respect to the total running distance (motor driving time) in the last three days at the time at which the remaining running distance reaches 2,000 seconds corresponds to 1,300 seconds, i.e., 500 sheets, the number of repetitions of the adjustment mode is obtained such that 500 sheets/100=5 times because the adjustment mode is performed once every 100 sheets. The assumed running time needed for the adjustment mode is obtained such that 5 times×10 seconds=50 seconds, so that the running time needed for printing is obtained such that 1,300 seconds−50 seconds=1,250 seconds. 1,250 seconds/500 sheets=2.5 sheets, so that it is determined that 2.5 seconds 2.85 seconds (two sheets per job) mode is adopted. Then, the conversion to the number of sheets is re-performed based on the remaining running distance of the remaining print lifetime using "two sheets per job" instead of "ten sheets per job", and the number of remaining printable sheets is determined.

Calculation result of the number of remaining sheets through conversion in the case of ten sheets per job: 2,000 second/1.85 seconds=1,080 sheets Calculation result of the number of remaining sheets through conversion in the case of two sheets per job: 2,000 seconds/2.85 seconds=701 sheets 700 sheets The above-described results are displayed, and thereafter, countdown is performed using the number of printed sheets instead of using the running distance (motor driving time). The initial number of remaining sheets of 1,080 sheets is changed to 700 sheets based on the above-described correction result, and thereafter, countdown is performed from 700 sheets every time one sheet is printed, as a remaining amount displayed until the designated consumable replacement time. The number of remaining sheets may be displayed side by side for each of conditions using a sheet size, a color mode, or the like as a prerequisite, on the basis of the above-described calculation results.

TABLE 1

| | Job Mode (Sheets/Job) | | | | |
|---|---|---|---|---|---|
| | 20/Job | 10/Job | 5/Job | 2/Job | 1/Job |
| Running Time Needed For 1 Job (Seconds) | 32.5 | 17.5 | 10.0 | 5.5 | 4.0 |

TABLE 1-continued

| | Job Mode (Sheets/Job) | | | | |
|---|---|---|---|---|---|
| | 20/Job | 10/Job | 5/Job | 2/Job | 1/Job |
| Average Running Time Needed For 1 Sheet In Each Job Mode (1) (Seconds) | 1.625 | 1.75 | 2.00 | 2.75 | 4.00 |
| (1) + Average Adjustment Mode Execution Time Needed For 1 Sheet (Seconds) | 1.725 | 1.86 | 2.10 | 2.85 | 4.10 |

As described above, according to the embodiments, when presenting an appropriate replacement time of a consumable, it is possible to predict an available remaining amount in accordance with a use state of the user, and present an appropriate replacement time of the consumable based on a prediction result.

According to an embodiment of the present invention, a consumption speed of a consumable is analyzed on the basis of a degree of use frequency of the consumable obtained from a use history of the consumable, so that, for example, it is possible to obtain the consumption speed of the consumable depending on the use frequency of the consumable in each of the busy period, the slack period, and the average period of the user. Further, according to an embodiment of the present invention, a replacement time of the consumable is predicted based on the use condition of the consumable and the consumption speed of the consumable, so that it is possible to predict the replacement time of the consumable while applying the consumption speed of the consumable corresponding to the use condition of the currently used consumable. As a result, it is possible to present an appropriate replacement time of the consumable to the user.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A consumable management apparatus comprising:
    a detecting unit that detects a use condition of a consumable;
    a storage unit that stores therein a use history of the consumable;
    an analyzing circuit configured to analyze a consumption speed of the consumable based on a degree of use frequency of the consumable, the degree of use frequency being obtained from the use history of the consumable stored in the storage unit;
    a predicting circuit configured to predict a replacement time of the consumable from the use condition of the consumable detected by the detecting unit and the consumption speed of the consumable analyzed by the analyzing circuit; and
    a notifying circuit configured to give a notice of the replacement time of the consumable predicted by the predicting circuit,
    wherein
    the analyzing circuit is further configured to calculate an available remaining amount of the consumable based on a use history of a predetermined period within the use history stored in the storage unit,
    the consumable management apparatus further includes a display unit that displays the available remaining amount,
    the use history is a number of sheets to be printed per print job by a user in the predetermined period,
    the analyzing circuit predicts a time taken to a replacement time of the consumable, based on a relationship between the number of sheets to be printed in a single print job and an operating time of the consumable needed to execute the single print job, and
    the display unit displays, as the available remaining amount, the replacement time of the consumable.

2. The consumable management apparatus according to claim 1, wherein
    the analyzing circuit analyzes the consumption speed of the consumable for each of different cases, based on a degree of past use frequency of the consumable, the degree of past use frequency being obtained from the use history of the consumable stored in the storage unit, and
    the predicting circuit predicts a replacement time of a currently used consumable by selectively applying the consumption speed of any of the cases corresponding to the use condition of the currently used consumable.

3. The consumable management apparatus according to claim 2, wherein
    the analyzing circuit analyzes the consumption speed of the consumable based on a degree of use frequency of the consumable per unit time.

4. The consumable management apparatus according to claim 1, wherein
    the analyzing circuit analyzes the consumption speed of the consumable based on a degree of use frequency of the consumable in a past predetermined period of the currently used consumable from the use history of the consumable stored in the storage unit, and
    the predicting circuit predicts a replacement time of the currently used consumable from a consumption speed of the currently used consumable in the past predetermined period.

5. The consumable management apparatus according to claim 1, wherein
    when a use condition of the consumable is set, the analyzing circuit analyzes the consumption speed of the consumable by further taking into account the set use condition.

6. The consumable management apparatus according to claim 1, wherein
    when a use condition of the consumable is set, the predicting circuit predicts a replacement time of the consumable by further taking into account the set use condition.

7. The consumable management apparatus according to claim 1, wherein
    the detecting unit, the storage unit, the analyzing circuit, the predicting circuit, and the notifying circuit are included in an apparatus that uses the consumable.

8. The consumable management apparatus according to claim 1, wherein
    the detecting unit is included in an apparatus that uses the consumable,
    the storage unit, the analyzing circuit, and the predicting circuit are included in an externally connected apparatus, and
    the notifying circuit is included in one of the apparatus and the externally connected apparatus.

9. The consumable management apparatus according to claim 1, wherein
    the analyzing circuit calculates an operating time of the consumable per sheet in the single print job based on the relationship between the number of sheets to be printed in the single print job and the operating time of the consumable needed to perform the single print job, and converts a time taken to the replacement time of the consumable into number of printable sheets to be printed until the replacement time is reached based on the operating time per sheet, and
    the display unit displays, as the available remaining amount, the number of printable sheets.

10. The consumable management apparatus according to claim 9, wherein the use history further includes a sheet size used by the user.

11. The consumable management apparatus according to claim 10, wherein
    the analyzing circuit calculates the number of printable sheets for each sheet size; and
    the display unit displays, as the available remaining amount, the number of printable sheets for each sheet size.

12. The consumable management apparatus according to claim 9, wherein
the use history further includes a color mode used by a user.

13. The consumable management apparatus according to claim 12, wherein
the analyzing circuit calculates the number of printable sheets for each color mode; and
the display unit displays, as the available remaining amount, the number of printable sheets for each color mode.

14. The consumable management apparatus according to claim 1, wherein
a timing at which the display unit starts to display the available remaining amount is set depending on the consumable, and
the consumable management apparatus further comprises:
a changing circuit configured to set a threshold for a period from the timing of starting display to the replacement time, and change the timing of starting display when the threshold is exceeded.

15. A consumable management system comprising:
an apparatus that includes a consumable; and
a consumable management apparatus that includes:
　a detecting unit that detects a use condition of the consumable;
　a storage unit that stores therein a use history of the consumable;
　an analyzing circuit configured to analyze a consumption speed of the consumable based on a degree of use frequency of the consumable, the degree of use frequency being obtained from the use history of the consumable stored in the storage unit;
　a predicting circuit configured to predict a replacement time of the consumable from the use condition of the consumable detected by the detecting unit and the consumption speed of the consumable analyzed by the analyzing circuit; and
　a notifying circuit configured to give a notice of the replacement time of the consumable predicted by the predicting circuit,
wherein
the analyzing circuit is further configured to calculate an available remaining amount of the consumable based on a use history of a predetermined period within the use history stored in the storage unit,
the consumable management apparatus further includes a display unit that displays the available remaining amount,
the use history is a number of sheets to be printed per print job by a user in the predetermined period,
the analyzing circuit predicts a time taken to a replacement time of the consumable, based on a relationship between the number of sheets to be printed in a single print job and an operating time of the consumable needed to execute the single print job, and
the display unit displays, as the available remaining amount, the replacement time of the consumable.

16. A consumable management method implemented by a consumable management apparatus that manages a consumable of an apparatus, the consumable management method comprising:
acquiring a use condition of the consumable;
acquiring and storing, in a storage unit, a use history of the consumable;
analyzing a consumption speed of the consumable based on a degree of use frequency of the consumable, the degree of use frequency being obtained from the use history of the consumable;
predicting a replacement time of the consumable from the use condition of the consumable and the consumption speed of the consumable; and
giving a notice of the replacement time of the consumable,
wherein
the method includes calculating an available remaining amount of the consumable based on a use history of a predetermined period within the use history stored in the storage unit,
the consumable management apparatus further includes a display unit that displays the available remaining amount,
the use history is a number of sheets to be printed per print job by a user in the predetermined period,
the analyzing further includes predicting a time taken to a replacement time of the consumable, based on a relationship between the number of sheets to be printed in a single print job and an operating time of the consumable needed to execute the single print job, and
the display unit displays, as the available remaining amount, the replacement time of the consumable.

17. The consumable management method according to claim 16, wherein
the analyzing includes:
　the calculating the available remaining amount of the consumable based on the use history of the predetermined period within the use history; and
the method further includes displaying the available remaining amount.

* * * * *